United States Patent
Wightman

(10) Patent No.: US 6,915,648 B2
(45) Date of Patent: Jul. 12, 2005

(54) VAPOR COMPRESSION SYSTEMS, EXPANSION DEVICES, FLOW-REGULATING MEMBERS, AND VEHICLES, AND METHODS FOR USING VAPOR COMPRESSION SYSTEMS

(75) Inventor: David A. Wightman, Prospect Heights, IL (US)

(73) Assignee: XDX Inc., Arlington Heights, IL (US)

( * ) Notice: Subject to any disclaimer, the term of this patent is extended or adjusted under 35 U.S.C. 154(b) by 132 days.

(21) Appl. No.: 10/327,707

(22) Filed: Dec. 20, 2002

(65) Prior Publication Data

US 2003/0121274 A1 Jul. 3, 2003

Related U.S. Application Data

(63) Continuation-in-part of application No. 09/809,798, filed on Mar. 16, 2001, which is a continuation-in-part of application No. 09/661,477, filed on Sep. 14, 2000, now Pat. No. 6,401,470.

(51) Int. Cl.$^7$ .............................................. F25B 41/04
(52) U.S. Cl. ..................... 62/222; 62/511; 236/92 B; 236/92 R
(58) Field of Search ........................... 62/222, 223, 224, 62/225, 511; 236/92 B, 92 R; 251/11, 205, 326, 327, 328; 29/890.127

(56) References Cited

U.S. PATENT DOCUMENTS

| | | |
|---|---|---|
| 1,017,292 A | 2/1912 | Hyde |
| 1,907,885 A | 5/1933 | Shively |
| 2,084,755 A | 6/1937 | Young, Jr. |
| 2,112,039 A | 3/1938 | McLenegan |
| 2,126,364 A | 3/1938 | Witzel |
| 2,164,761 A | 7/1939 | Ashley |
| 2,200,118 A | 5/1940 | Miller |
| 2,229,940 A | 1/1941 | Spofford |
| 2,241,086 A | * 5/1941 | Gould .......................... 62/223 |
| 2,323,408 A | 7/1943 | Miller |

(Continued)

FOREIGN PATENT DOCUMENTS

| | | |
|---|---|---|
| BE | 773764 | 1/1972 |
| DE | 197 52 259 A1 | 6/1998 |

(Continued)

OTHER PUBLICATIONS

03304466; Hiroshi et al.; Air Conditioner, Nov. 15, 1990; Pub. No. 02–279966; Pg. 156.

(Continued)

*Primary Examiner*—Fadi H. Dahbour
(74) *Attorney, Agent, or Firm*—Brinks Hofer Gilson & Lione; Gregory H. Zayia

(57) ABSTRACT

Flow-regulating members are described that include a primary channel and a plurality of secondary channels. The primary channel defines a primary channel orifice in the flow-regulating member and the plurality of secondary channels define a plurality of secondary channel orifices in the flow-regulating member. The plurality of secondary channel orifices are located along a common periphery of the flow-regulating member, such that an axis passing through the primary channel orifice intersects a plane containing the common periphery at a unique point. At least two of the plurality of secondary channel orifices have different cross-sectional areas. At least one of the plurality of secondary channels intersects the primary channel. Expansion devices containing these flow-regulating members are also described, as are vapor compression systems containing expansion devices, and methods of operating vapor compression systems.

55 Claims, 12 Drawing Sheets

U.S. PATENT DOCUMENTS

| | | | |
|---|---|---|---|
| 2,467,519 A | 4/1949 | Borghesan | |
| 2,471,448 A | 5/1949 | Platon | |
| 2,511,565 A | 6/1950 | Carter | |
| 2,520,191 A | 8/1950 | Aughey et al. | |
| 2,539,062 A | 1/1951 | Dillman | |
| 2,547,070 A | 4/1951 | Aughey et al. | |
| 2,571,625 A | 10/1951 | Seldon | |
| 2,596,036 A | 5/1952 | MacDougall | |
| 2,707,868 A | 5/1955 | Goodman | |
| 2,755,025 A | 7/1956 | Boles | |
| 2,771,092 A | 11/1956 | Schenk | |
| 2,856,759 A | 10/1958 | Barbulesco | |
| 2,922,292 A | 1/1960 | Lange | |
| 2,944,411 A | 7/1960 | McGrath | |
| 2,960,845 A | 11/1960 | Lange | |
| 3,007,681 A | 11/1961 | Keller | |
| 3,014,351 A | 12/1961 | Leimbach | |
| 3,017,903 A * | 1/1962 | Steffens | 62/222 |
| 3,060,699 A | 10/1962 | Tilney | |
| 3,115,896 A | 12/1963 | Roberts et al. | |
| 3,138,007 A | 6/1964 | Friedman et al. | |
| 3,150,498 A | 9/1964 | Blake | |
| 3,194,499 A | 7/1965 | Noakes et al. | |
| 3,257,822 A | 6/1966 | Abbott | |
| 3,316,731 A | 5/1967 | Quick | |
| 3,343,375 A | 9/1967 | Quick | |
| 3,392,542 A | 7/1968 | Nussbaum | |
| 3,402,566 A | 9/1968 | Leimbach | |
| 3,427,819 A | 2/1969 | Seghetti | |
| 3,464,226 A | 9/1969 | Kramer | |
| 3,520,147 A | 7/1970 | Glackman | |
| 3,631,686 A | 1/1972 | Kautz | |
| 3,633,378 A | 1/1972 | Toth | |
| 3,638,444 A | 2/1972 | Lindahl | |
| 3,638,447 A | 2/1972 | Abe | |
| 3,683,637 A | 8/1972 | Oshima et al. | |
| 3,696,628 A | 10/1972 | Coyle, Sr. | |
| 3,698,204 A | 10/1972 | Schlotterbeck et al. | |
| 3,708,998 A | 1/1973 | Scherer et al. | |
| 3,727,423 A | 4/1973 | Nielson | |
| 3,785,163 A | 1/1974 | Wagner | |
| 3,792,594 A | 2/1974 | Kramer | |
| 3,798,920 A | 3/1974 | Morgan | |
| 3,812,882 A | 5/1974 | Taylor | |
| 3,822,562 A | 7/1974 | Crosby | |
| 3,835,659 A * | 9/1974 | McBride, Jr. | 62/225 |
| 3,866,427 A | 2/1975 | Rothmayer et al. | |
| 3,869,872 A * | 3/1975 | Webber | 62/225 |
| 3,921,413 A | 11/1975 | Kohlbeck | |
| 3,934,424 A | 1/1976 | Goldsberry | |
| 3,934,426 A | 1/1976 | Jespersen et al. | |
| 3,948,060 A | 4/1976 | Gaspard | |
| 3,965,693 A | 6/1976 | Widdowson | |
| 3,967,466 A | 7/1976 | Edwards | |
| 3,967,782 A | 7/1976 | Eschbaugh et al. | |
| 3,968,660 A | 7/1976 | Amann et al. | |
| 3,980,129 A | 9/1976 | Bergdahl | |
| 4,003,729 A | 1/1977 | McGrath | |
| 4,003,798 A | 1/1977 | McCord | |
| 4,006,601 A | 2/1977 | Ballarin et al. | |
| 4,103,508 A | 8/1978 | Apple | |
| 4,106,691 A | 8/1978 | Nielsen | |
| 4,122,686 A | 10/1978 | Lindahl et al. | |
| 4,122,688 A | 10/1978 | Mochizuki et al. | |
| 4,136,528 A | 1/1979 | Vogel et al. | |
| 4,151,722 A | 5/1979 | Willitts et al. | |
| 4,159,078 A | 6/1979 | Diermayer et al. | |
| 4,163,373 A | 8/1979 | van der Sluijs | |
| 4,167,102 A | 9/1979 | Willitts | |
| 4,176,525 A | 12/1979 | Tucker et al. | |
| 4,182,133 A | 1/1980 | Haas et al. | |
| 4,184,341 A | 1/1980 | Friedman | |
| 4,191,326 A | 3/1980 | Diermayer et al. | |
| 4,193,270 A | 3/1980 | Scott | |
| 4,207,749 A | 6/1980 | Lavigne, Jr. | |
| 4,230,470 A | 10/1980 | Matsuda et al. | |
| 4,235,079 A | 11/1980 | Masser | |
| 4,245,778 A | 1/1981 | Diermayer et al. | |
| 4,270,362 A | 6/1981 | Lancia et al. | |
| 4,285,205 A | 8/1981 | Martin et al. | |
| 4,290,480 A | 9/1981 | Sulkowski | |
| 4,302,945 A | 12/1981 | Bell | |
| 4,311,020 A | 1/1982 | Tobin et al. | |
| 4,328,682 A | 5/1982 | Vana | |
| 4,337,892 A | 7/1982 | Diermayer et al. | |
| 4,350,021 A | 9/1982 | Lundstrom | |
| 4,377,274 A * | 3/1983 | Mayhew, Jr. | 251/327 |
| 4,398,396 A | 8/1983 | Schmerzler | |
| 4,430,866 A | 2/1984 | Willitts | |
| 4,451,273 A | 5/1984 | Cheng et al. | |
| 4,485,642 A | 12/1984 | Karns | |
| 4,493,364 A | 1/1985 | Macriss et al. | |
| 4,543,802 A | 10/1985 | Ingelmann et al. | |
| 4,554,948 A | 11/1985 | Bergmann | |
| 4,583,582 A | 4/1986 | Grossman | |
| 4,596,123 A | 6/1986 | Cooperman | |
| 4,606,198 A | 8/1986 | Latshaw et al. | |
| 4,612,783 A | 9/1986 | Mertz | |
| 4,621,505 A | 11/1986 | Ares et al. | |
| 4,633,681 A | 1/1987 | Webber | |
| 4,646,407 A * | 3/1987 | Mayhew, Jr. | 29/890.127 |
| 4,658,596 A | 4/1987 | Kuwahara | |
| 4,660,385 A | 4/1987 | Macriss et al. | |
| 4,742,694 A | 5/1988 | Yamanaka et al. | |
| 4,779,425 A | 10/1988 | Sasaki et al. | |
| 4,798,365 A * | 1/1989 | Mayhew | 251/205 |
| 4,813,474 A | 3/1989 | Umezu | |
| 4,848,100 A | 7/1989 | Barthel et al. | |
| 4,852,364 A | 8/1989 | Seener et al. | |
| 4,854,130 A | 8/1989 | Naruse et al. | |
| 4,881,718 A | 11/1989 | Champagne | |
| 4,888,957 A | 12/1989 | Chmielewski | |
| 4,909,277 A | 3/1990 | Vandiver | |
| 4,938,032 A | 7/1990 | Mudford | |
| 4,942,740 A | 7/1990 | Shaw et al. | |
| 4,947,655 A | 8/1990 | Shaw | |
| 4,955,205 A | 9/1990 | Wilkinson | |
| 4,955,207 A | 9/1990 | Mink | |
| 4,979,372 A | 12/1990 | Tanaka | |
| 4,984,433 A | 1/1991 | Worthington | |
| 5,011,112 A | 4/1991 | Glamm | |
| 5,044,551 A | 9/1991 | Tanaka et al. | |
| 5,050,393 A | 9/1991 | Bryant | |
| 5,058,388 A | 10/1991 | Shaw et al. | |
| 5,062,276 A | 11/1991 | Dudley | |
| 5,065,591 A | 11/1991 | Shaw | |
| 5,070,707 A | 12/1991 | Ni | |
| 5,072,597 A | 12/1991 | Bromley et al. | |
| 5,076,068 A | 12/1991 | Mikhail | |
| 5,094,598 A | 3/1992 | Amata et al. | |
| 5,107,906 A | 4/1992 | Swenson et al. | |
| 5,118,071 A * | 6/1992 | Huelle | 251/11 |
| 5,129,234 A | 7/1992 | Alford | |
| 5,131,237 A | 7/1992 | Valbjorn | |
| 5,168,715 A | 12/1992 | Nakao et al. | |
| 5,181,552 A | 1/1993 | Eiermann | |
| 5,195,331 A | 3/1993 | Zimmern et al. | |
| 5,231,845 A | 8/1993 | Sumitani et al. | |
| 5,249,433 A | 10/1993 | Hardison et al. | |
| 5,251,459 A | 10/1993 | Grass et al. | |
| 5,253,482 A | 10/1993 | Murway | |

| | | |
|---|---|---|
| 5,291,941 A | 3/1994 | Enomoto et al. |
| 5,303,561 A | 4/1994 | Bahel et al. |
| 5,305,610 A | 4/1994 | Bennett et al. |
| 5,309,725 A | 5/1994 | Cayce |
| 5,329,781 A | 7/1994 | Farrey et al. |
| 5,355,323 A | 10/1994 | Bae |
| 5,377,498 A | 1/1995 | Cur et al. |
| 5,408,835 A | 4/1995 | Anderson |
| 5,417,083 A | 5/1995 | Eber |
| 5,423,480 A | 6/1995 | Heffner et al. |
| 5,440,894 A | 8/1995 | Schaeffer et al. |
| 5,509,272 A | 4/1996 | Hyde |
| 5,515,695 A | 5/1996 | Sakakibara et al. |
| 5,520,004 A | 5/1996 | Jones, III |
| 5,544,809 A | 8/1996 | Keating et al. |
| 5,546,757 A | 8/1996 | Whipple, III |
| 5,586,441 A | 12/1996 | Wilson et al. |
| 5,597,117 A | 1/1997 | Watanabe et al. |
| 5,598,715 A | 2/1997 | Edmisten |
| 5,615,560 A | 4/1997 | Inoue |
| 5,622,055 A | 4/1997 | Mei et al. |
| 5,622,057 A | 4/1997 | Bussjager et al. |
| 5,634,355 A | 6/1997 | Cheng et al. |
| 5,642,858 A | 7/1997 | Kakehashi et al. |
| 5,651,258 A | 7/1997 | Harris |
| 5,678,417 A | 10/1997 | Nigo et al. |
| 5,689,962 A | 11/1997 | Rafalovich |
| 5,692,387 A | 12/1997 | Alsenz et al. |
| 5,694,782 A | 12/1997 | Alsenz |
| 5,706,665 A | 1/1998 | Gregory |
| 5,706,666 A | 1/1998 | Yamanaka et al. |
| 5,743,100 A | 4/1998 | Welguisz et al. |
| 5,752,390 A | 5/1998 | Hyde |
| 5,765,391 A | 6/1998 | Lee et al. |
| 5,806,321 A | 9/1998 | Bendtsen et al. |
| 5,813,242 A | 9/1998 | Lawrence et al. |
| 5,826,438 A | 10/1998 | Ohishi et al. |
| 5,839,505 A | 11/1998 | Ludwig et al. |
| 5,842,352 A | 12/1998 | Gregory |
| 5,845,511 A | 12/1998 | Okada et al. |
| 5,850,968 A | 12/1998 | Jokinen |
| 5,862,676 A | 1/1999 | Kim et al. |
| 5,867,998 A | 2/1999 | Guertin |
| 5,887,651 A | 3/1999 | Meyer |
| 5,964,099 A | 10/1999 | Kim |
| 5,987,916 A | 11/1999 | Egbert |
| 6,092,733 A | 7/2000 | Watanabe et al. |
| 6,185,958 B1 | 2/2001 | Wightman |
| 6,220,566 B1 | 4/2001 | Miller |
| 6,241,157 B1 | 6/2001 | Yano et al. |
| 6,314,747 B1 | 11/2001 | Wightman |
| 6,318,118 B2 | 11/2001 | Hanson et al. |
| 6,375,086 B1 * | 4/2002 | Babin et al. ............... 236/92 B |
| 6,389,825 B1 | 5/2002 | Wightman |
| 6,393,851 B1 | 5/2002 | Wightman |
| 6,397,629 B2 | 6/2002 | Wightman |
| 6,401,470 B1 | 6/2002 | Wightman |
| 6,430,950 B1 | 8/2002 | Dienhart et al. |
| 6,510,700 B1 * | 1/2003 | Lundberg .................... 62/222 |
| 2003/0121274 A1 | 7/2003 | Wightman |

FOREIGN PATENT DOCUMENTS

| | | |
|---|---|---|
| DE | 197 43 734 A1 | 4/1999 |
| EP | 0355180 | 2/1990 |
| EP | 0 355 180 A2 | 2/1990 |
| FR | 1517003 | 2/1968 |
| JP | 58146778 | 9/1983 |
| JP | 03020577 | 1/1991 |
| JP | 10325630 | 8/1998 |
| JP | 10306958 | 11/1998 |
| WO | WO 93/06422 | 4/1993 |
| WO | WO 95/03515 | 2/1995 |
| WO | WO 98/03827 | 1/1998 |
| WO | WO 98/57104 | 12/1998 |
| WO | WO 99/45447 | 9/1999 |
| WO | WO 00/42364 | 7/2000 |
| WO | WO 01/33147 | 5/2001 |
| WO | WO 02/23102 A1 | 3/2002 |

OTHER PUBLICATIONS

02979575; Tadashi et al.; Refrigerating Cycle; Nov. 7, 1989; Pub. No. 01–277175; Pg. 46.

04001275; Tomomi et al.; Air Conditioner; Dec. 18, 1992; Pub. No. 04–366375; Pg. 69.

Kominkiewicz, Frank, Memo, dated Feb. 17, 2000, Subject "Tocogen Chiller", 6 pages.

Vienna–Tyler Dec. Case, Memo, dated Feb. 25, 2000, Compressor Model D6VD12, Serial N159282.

U.S. Appl. No. 09/443,071, pending, filed Nov. 18, 1999, entitled Vapor Compression System and Method.

International Application No. PCT/US00/00663 entitled Vapor Compression System and Method International Filing Date: Jan. 11, 2000.

Noble Alloy Valve, "Ball Valve Repair Manual," Jan. 26, 2000.

* cited by examiner

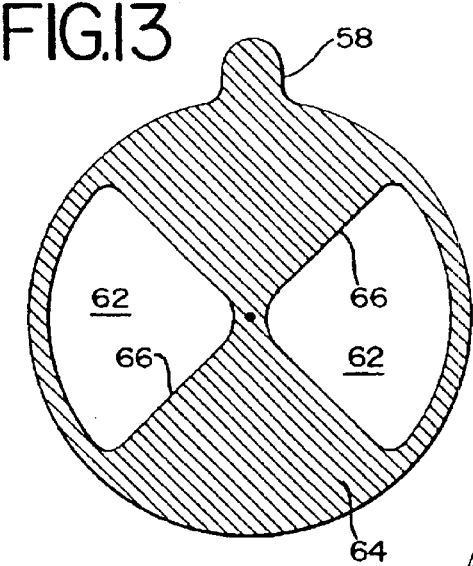
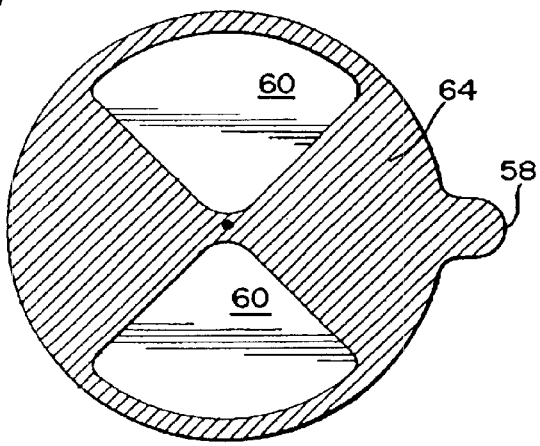
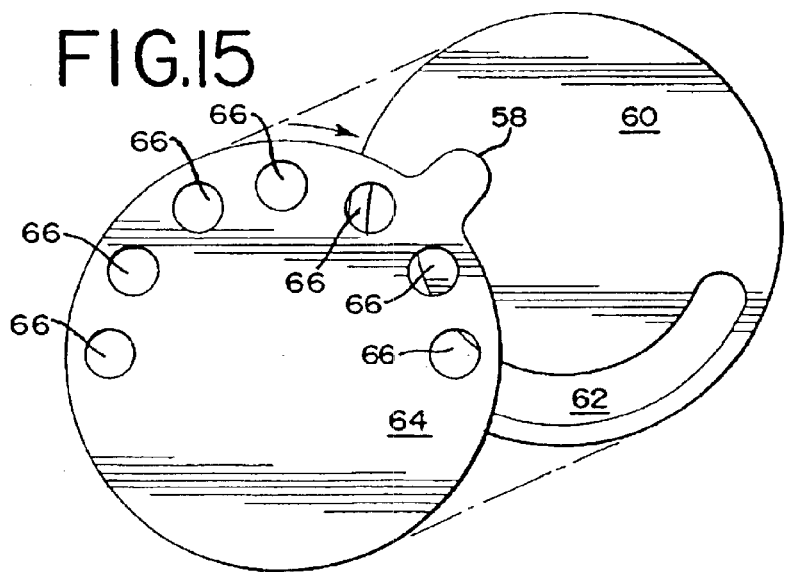

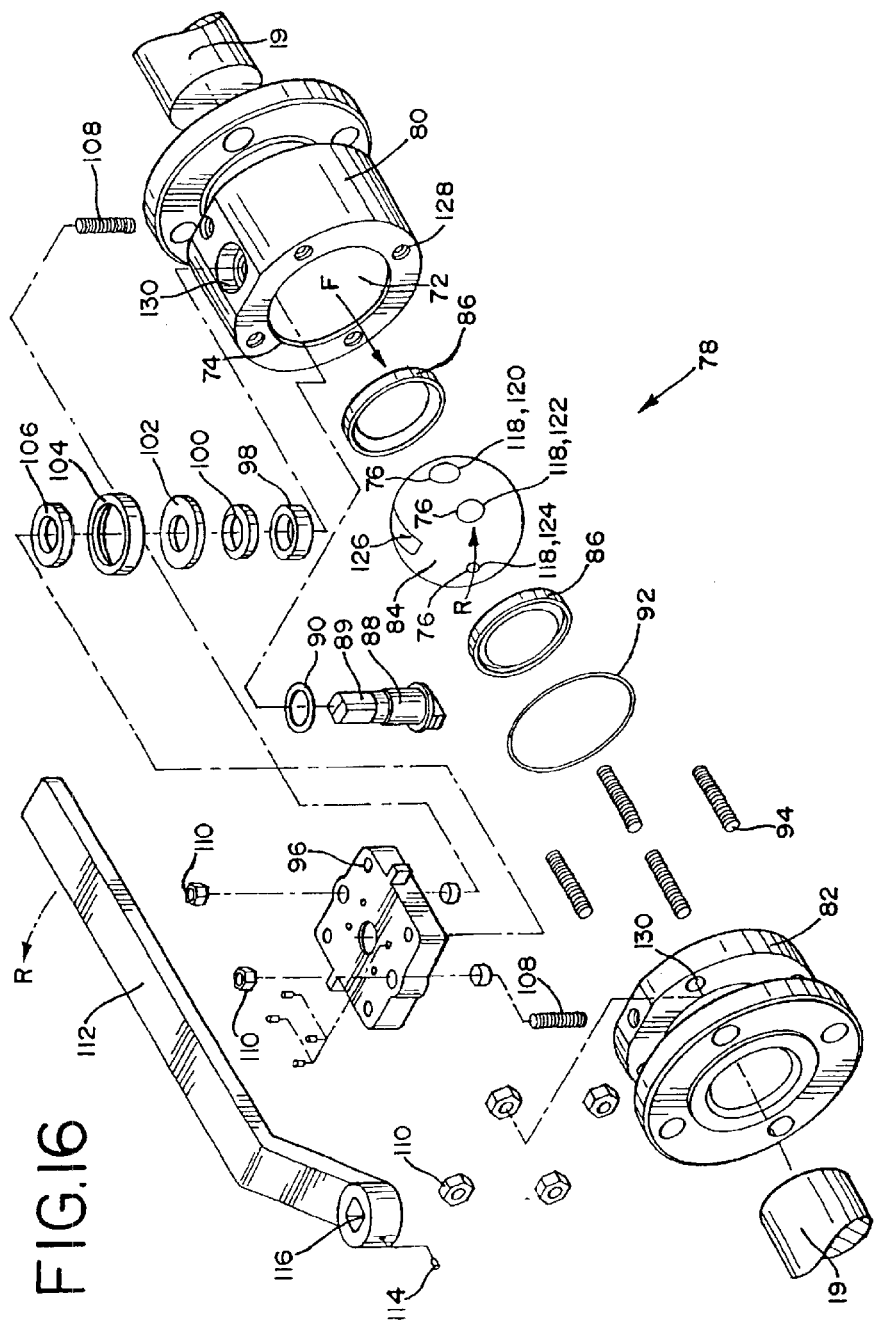

VAPOR COMPRESSION SYSTEMS, EXPANSION DEVICES, FLOW-REGULATING MEMBERS, AND VEHICLES, AND METHODS FOR USING VAPOR COMPRESSION SYSTEMS

RELATED APPLICATIONS

This application is a continuation-in-part of application Ser. No. 09/809,798 filed Mar. 16, 2001, which in turn is a continuation-in-part of application Ser. No. 09/661,477 filed Sep. 14, 2000, now U.S. Pat. No. 6,401,470. The entire contents of both documents are incorporated herein by reference, except that in the event of any inconsistent disclosure or definition from the present application, the disclosure or definition herein shall be deemed to prevail.

BACKGROUND

This invention relates, in general, to vapor compression systems, and more particularly, to an expansion device for a vapor compression system.

In a closed-loop vapor compression cycle, heat transfer fluid changes state from a vapor to a liquid in the condenser, giving off heat to ambient surroundings, and changes state from a liquid to a vapor in the evaporator, absorbing heat from the ambient surroundings during vaporization. A typical vapor compression system includes a compressor for pumping heat transfer fluid, such as a freon, to a condenser, where heat is given off as the heat transfer fluid condenses into a liquid. The heat transfer fluid then flows through a liquid line to an expansion device, where the heat transfer fluid undergoes a volumetric expansion. The heat transfer fluid exiting the expansion device is usually a low quality liquid vapor mixture. As used herein, the term "low quality liquid vapor mixture" refers to a low pressure heat transfer fluid in a liquid state with a small presence of flash gas that cools off the remaining heat transfer fluid as the heat transfer fluid continues on in a sub-cooled state. The expanded heat transfer fluid then flows into an evaporator. The evaporator includes a coil having an inlet and an outlet, wherein the heat transfer fluid is vaporized at a low pressure absorbing heat while it undergoes a change of state from a liquid to a vapor. The heat transfer fluid, now in the vapor state, flows through the coil outlet and exits the evaporator. The heat transfer fluid then flows through a suction line and back to the compressor. A typical vapor compression system may include more than one expansion device. Moreover, the expansion device may be placed in various locations within a vapor compression system. For example, as the heat transfer fluid flows into an evaporator it may flow through a second expansion device, where the heat transfer fluid undergoes a second volumetric expansion. Additionally, a typical vapor compression system may include a nozzle or fixed orifice.

In one aspect, the efficiency of the vapor compression cycle depends upon the precise control of the volumetric expansion of a heat transfer fluid in various locations within a vapor compression system. Heat transfer fluid is volumetrically expanded when the heat transfer fluid flows through an expansion device, such as a thermostatic expansion valve, a capillary tube, and a pressure control, or when the heat transfer fluid flows through a nozzle or fixed orifice. Often times, the rate at which a heat transfer fluid is volumetrically expanded needs to be varied depending on the conditions within the vapor compression system. Devices such as capillary tubes, pressure controls, nozzles, or fixed orifices are fixed in size and cannot vary the rate at which a heat transfer fluid is volumetrically expanded. While many thermostatic expansion valves can vary the rate at which a heat transfer fluid is volumetrically expanded, they are complex and rather costly to manufacture. Moreover, thermostatic expansion valves are not as precise as capillary tubes, pressure controls, nozzles, or fixed orifices, when it comes to controlling the rate at which heat transfer fluid is volumetrically expanded.

Accordingly, further development of vapor compression systems and of expansion devices for vapor compression systems is needed. In particular, the development of expansion devices capable of responding rapidly and precisely to variations in volumetric expansion rate are needed.

SUMMARY

The scope of the present invention is defined solely by the appended claims, and is not affected to any degree by the statements within this summary.

A vapor compression system embodying features of the present invention includes a line for flowing a heat transfer fluid, a compressor connected with the line for increasing a pressure and a temperature of the heat transfer fluid, a condenser connected with the line for liquefying the heat transfer fluid, an evaporator connected with the line for transferring heat from an ambient surrounding to the heat transfer fluid, and an expansion device connected with the line. The expansion device includes a housing containing a first housing orifice and at least one ball within the housing. The ball contains a primary channel and a plurality of secondary channels, wherein the primary channel defines a primary channel orifice in the ball and the plurality of secondary channels define a plurality of secondary channel orifices in the ball. The plurality of secondary channel orifices are located along a circular periphery of the ball, such that an axis passing through the primary channel orifice intersects a plane containing the circular periphery at a unique point. At least two of the plurality of secondary channel orifices have different cross-sectional areas. The ball is moveable such that at least one of the primary channel orifice and the plurality of secondary channel orifices is configured for being substantially aligned with the first housing orifice. At least one of the plurality of secondary channels intersects the primary channel.

An expansion device for a vapor compression system embodying features of the present invention includes a housing containing a first housing orifice, and at least one ball within the housing. The ball contains a primary channel and a plurality of secondary channels, wherein the primary channel defines a primary channel orifice in the ball and the plurality of secondary channels define a plurality of secondary channel orifices in the ball. The plurality of secondary channel orifices are located along a circular periphery of the ball, such that an axis passing through the primary channel orifice intersects a plane containing the circular periphery at a unique point. At least two of the plurality of secondary channel orifices have different cross-sectional areas. The ball is moveable such that at least one of the primary channel orifice and the plurality of secondary channel orifices is configured for being substantially aligned with the first housing orifice. At least one of the plurality of secondary channels intersects the primary channel.

A flow-regulating member for an expansion device of a vapor compression system embodying features of the present invention has a primary channel and a plurality of secondary channels. The primary channel defines a primary channel orifice in the flow-regulating member and the plurality of secondary channels define a plurality of secondary channel orifices in the flow-regulating member. The plurality of secondary channel orifices are located along a common periphery of the flow-regulating member, such that an axis passing through the primary channel orifice intersects a plane containing the common periphery at a unique point. At least two of the plurality of secondary channel orifices have different cross-sectional areas. At least one of the plurality of secondary channels intersects the primary channel.

A vehicle embodying features of the present invention includes an expansion device of a type described above.

A method for operating a vapor compression system embodying features of the present invention includes flowing a heat transfer fluid through a line connected with each of a compressor for increasing a pressure and a temperature of the heat transfer fluid, a condenser for liquefying the heat transfer fluid, an evaporator for transferring heat from an ambient surrounding to the heat transfer fluid, and an expansion device of a type described above.

BRIEF DESCRIPTION OF THE DRAWINGS

FIG. 13 is a cross-sectional view of the expansion device in FIG. 9, wherein the expansion device is in a fully open position;

FIG. 14 is a cross-sectional view of the expansion device in FIG. 9, wherein the expansion device is in a fully closed position;

FIG. 15 is an exploded perspective view of an expansion device, in accordance with one embodiment of the invention;

FIG. 16 is an exploded perspective view of an expansion device, in accordance with one embodiment of the invention;

Figure 1:
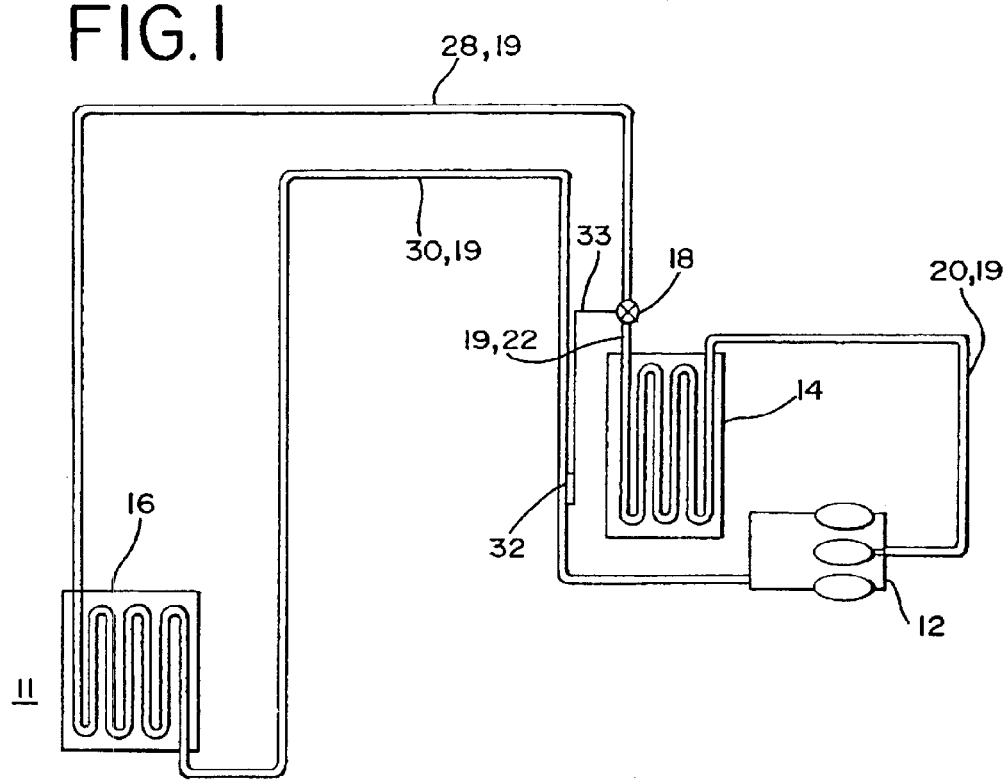
FIG. 1 is a schematic drawing of a vapor compression system arranged in accordance with one embodiment of the invention.

For simplicity and clarity of illustration, elements shown in the Figures have not necessarily been drawn to scale. For example, dimensions of some elements are exaggerated relative to each other. Further, when considered appropriate, reference numerals have been repeated among the Figures to indicate corresponding elements.

DETAILED DESCRIPTION OF THE PRESENTLY PREFERRED EMBODIMENTS

One embodiment of a vapor compression system 10 is illustrated in FIG. 1. Vapor compression system 10 includes a compressor 12 for increasing the pressure and temperature of a heat transfer fluid 34, a condenser 14 for liquefying the heat transfer fluid 34, an evaporator 16 for transferring heat from ambient surroundings to the heat transfer fluid 34, an expansion device 18 for expanding the heat transfer fluid 34, and a line 19 for flowing the heat transfer fluid. Line 19 allows for the flow of a heat transfer fluid 34 from one component of vapor compression system 10, such as compressor 12, condenser 14, evaporator 16, and expansion device 18, to another component of vapor compression system 10. Compressor 12, condenser 14, evaporator 16, and expansion device 18 are all connected with line 19. In one embodiment, line 19 includes discharge line 20, liquid line 22, saturated vapor line 28, and suction line 30, as illustrated in FIG. 1. In this embodiment, compressor 12 is connected with condenser 14 through discharge line 20, condenser 14 is connected with expansion device 18 through liquid line 22, expansion device 18 is connected with evaporator 16 through saturated vapor line 28, and evaporator 16 is connected with compressor 12 through suction line 30, as illustrated in FIG. 1.

In one embodiment, vapor compression system 10 includes a sensor 32 operably connected to expansion device 18. Sensor 32 can be used to vary the rate at which a heat transfer fluid 34 is volumetrically expanded through expansion device 18. Preferably, sensor 32 is mounted to a portion of line 19, such as suction line 30, and is operably connected to expansion device 18. Sensor 32 can be any type of sensor known by those skilled in the art designed to detect conditions in and around vapor compression system 10, such as the temperature, pressure, enthalpy, and moisture of heat transfer fluid 34 or any other type of conditions that may be monitored in and around vapor compression system 10. For example, sensor 32 may be a pressure sensor that detect the pressure of heat transfer fluid 34 at a certain point within vapor compression system 10, or sensor 32 may be a temperature sensor which detects the temperature of ambient surroundings 11 around vapor compression system 10. Preferably, sensor 32 is operably connected to expansion device 18 through control line 33.

Vapor compression system 10 can utilize essentially any commercially available heat transfer fluid 34 including refrigerants such as, for example, chlorofluorocarbons such as R-12 which is a dichlorodifluoromethane, R-22 which is a monochlorodifluoromethane, R-500 which is an azeotropic refrigerant consisting of R-12 and R-152a, R-503 which is an azeotropic refrigerant consisting of R-23 and R-13, and R-502 which is an azeotropic refrigerant consisting of R-22 and R-115. Vapor compression system 10 can also utilize heat transfer fluids 34 including, but not limited to, refrigerants R-13, R-113, 141b, 123a, 123, R-114, and R-11. Additionally, vapor compression system 10 can utilize heat transfer fluids 34 including hydrochlorofluorocarbons such as 141b, 123a, 123, and 124; hydrofluorocarbons such as R-134a, 134, 152, 143a, 125, 32, 23; azeotropic HFCs such as AZ-20 and AZ-50 (which is commonly known as R-507); non-halogenated refrigerants such as R-717 (commonly known as ammonia); and blended refrigerants such as MP-39, HP-80, FC-14, and HP-62 (commonly known as R-404a). Accordingly, it should be appreciated that the particular heat transfer fluid 34 or combination of heat transfer fluids 34 utilized in the present invention is not deemed to be critical to the operation of the present invention since this invention is expected to operate with a greater system efficiency with virtually all heat transfer fluids 34 than is achievable by any previously known vapor compression system utilizing the same heat transfer fluid 34.

In one embodiment, compressor 12 compresses heat transfer fluid 34, to a relatively high pressure and temperature. The temperature and pressure to which heat transfer fluid 34 is compressed by compressor 12 will depend upon the particular size of vapor compression system 10 and the cooling load requirements of vapor compression system 10. Compressor 12 then pumps heat transfer fluid 34 into discharge line 20 and into condenser 14. In condenser 14, a medium such as air, water, or a secondary refrigerant is blown past coils within condenser 14 causing the pressurized heat transfer fluid 34 to change to a liquid state. The temperature of the heat transfer fluid 34 drops as the latent heat within the heat transfer fluid 34 is expelled during the condensation process. Condenser 14 discharges the liquefied heat transfer fluid 34 to liquid line 22.

As shown in FIG. 1, liquid line 22 discharges the heat transfer fluid 34 into expansion device 18 whereupon the heat transfer fluid 34 undergoes a volumetric expansion. In one embodiment, the heat transfer fluid discharged by condenser 14 enters expansion device 18 and undergoes a volumetric expansion at a rate determined by the conditions of suction line 30, such as temperature and pressure, at sensor 32. Sensor 32 relays information about the conditions of suction line 30, such a pressure and temperature, through control line 33 to expansion device 18. Upon undergoing a volumetric expansion, expansion device 18 discharges the heat transfer fluid 34 as a saturated vapor into saturated vapor line 28. Saturated vapor line 28 connects the expansion device 18 with the evaporator 16. Evaporator 16 transfers heat from ambient surroundings 11 to the heat transfer fluid 34. Ambient surroundings 11 is the atmosphere surrounding vapor compression system 10, as illustrated in FIG. 1. Upon exiting evaporator 16, heat transfer fluid 34 then travels through suction line 30 back to compressor 12.

While in the above embodiment expansion device 18 is connected with saturated vapor line 28 and liquid line 22, expansion device 18 may be connected with any component within vapor compression system 10 and expansion device 18 may be located at any point within vapor compression system 10. Preferably, expansion device 18 is located at a point within vapor compression system 10 in which it is desired to volumetrically expand heat transfer fluid 34, such as between condenser 14 and evaporator 16. More preferably, expansion device 18 is located at a point within vapor compression system 10 in which it is desired to vary the rate at which a heat transfer fluid 34 is volumetrically expanded, such as between condenser 14 and evaporator 16, as illustrated in FIG. 1. Expansion device 18 may be used in place of or in combination with metering devices such as, but not limited to, a thermostatic expansion valve, a capillary tube, a pressure control, a nozzle, and a fixed orifice. Preferably, heat transfer fluid 34 is volumetrically expanded when the heat transfer fluid 34 flows through expansion device 18.

Figure 2:
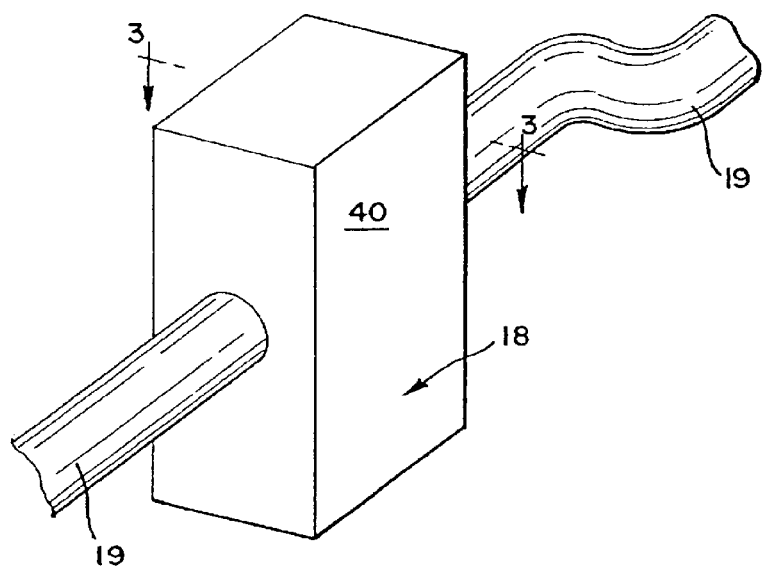
FIG. 2 is a perspective view of an expansion device connected with a line, in accordance with one embodiment of the invention.
Figure 3:
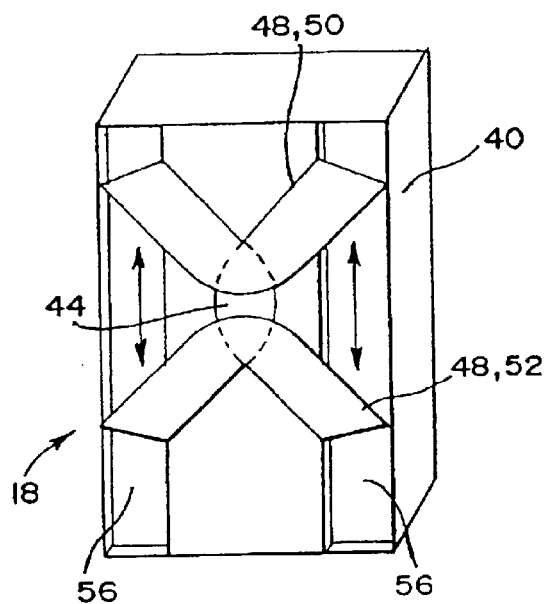
FIG. 3 is a cross-sectional perspective view of the expansion device in FIG. 2, wherein the expansion device is in a partially open position.
Figure 4:
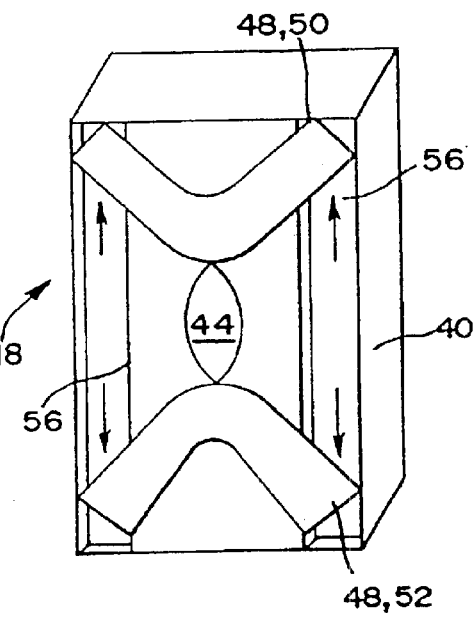
FIG. 4 is a cross-sectional perspective view of the expansion device in FIG. 2, wherein the expansion device is in a fully open position.
Figure 5:
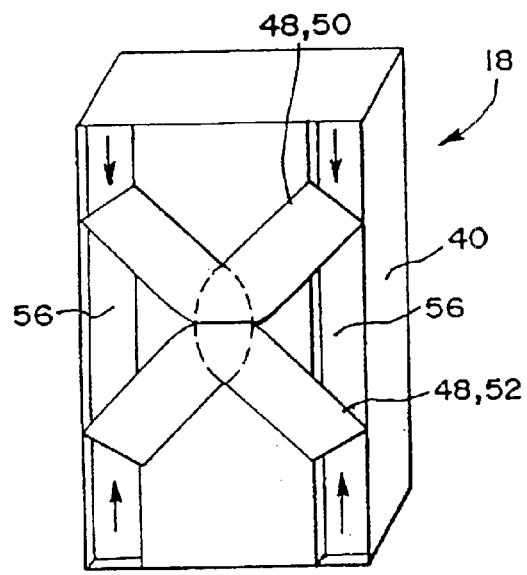
FIG. 5 is a cross-sectional perspective view of the expansion device in FIG. 2, wherein the expansion device is in a fully closed position.
Figure 6:
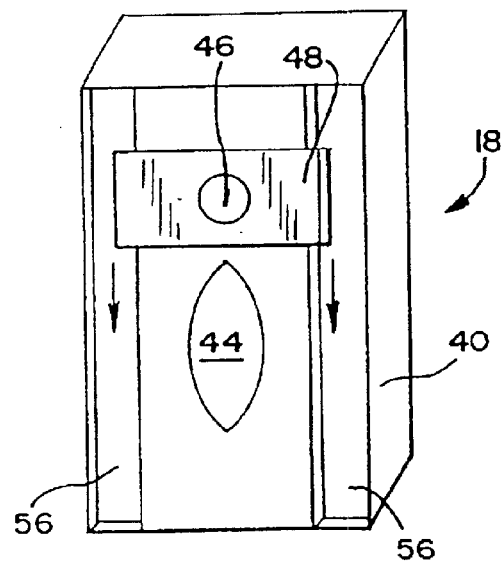
FIG. 6 is a cross-sectional perspective view of an expansion device, in accordance with one embodiment of the invention.
Figure 7:
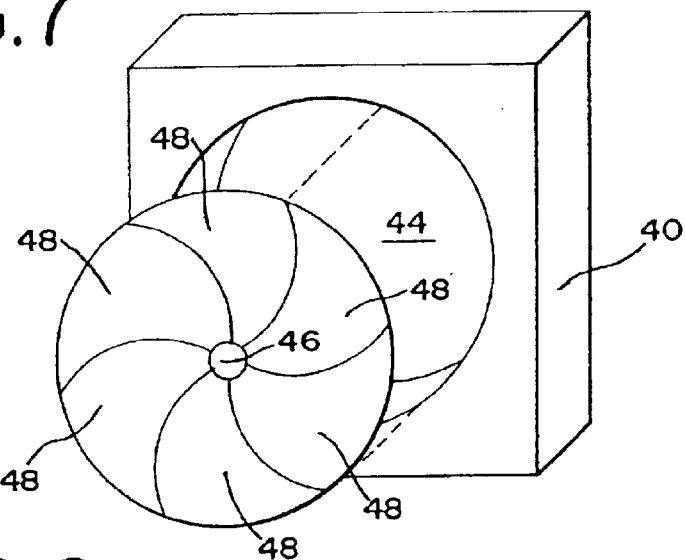
FIG. 7 is a cross-sectional perspective view of an expansion device, wherein the expansion device is in a closed position, in accordance with one embodiment of the invention.
Figure 8:
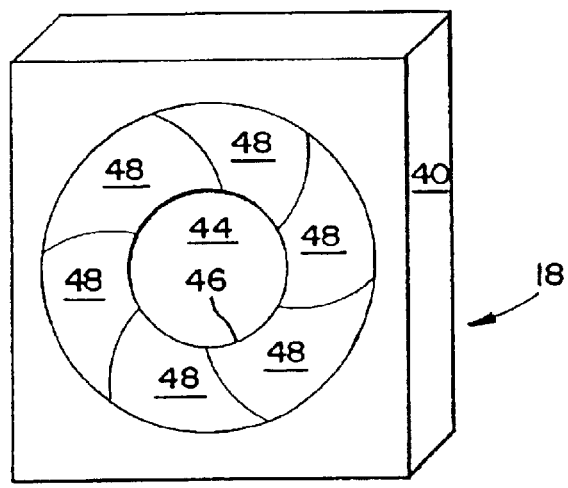
FIG. 8 is a cross-sectional perspective view of the expansion device in FIG. 6, wherein the expansion device is in a partially open position.
Figure 9:
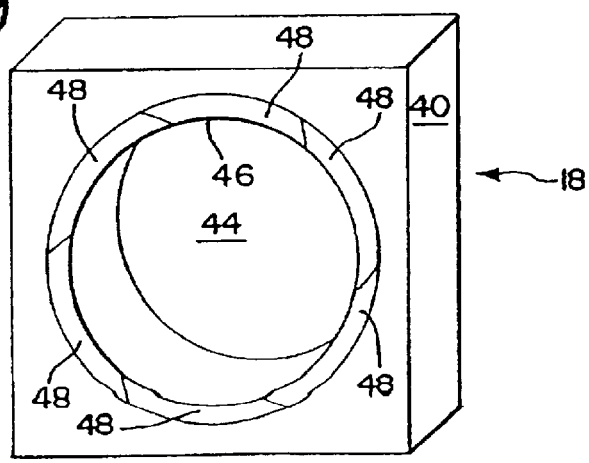
FIG. 9 is a cross-sectional perspective view of the expansion device in FIG. 6, wherein the expansion device is in a fully open position.

Shown in FIG. 2 is a perspective view of expansion device 18 connected with line 19, in accordance with one embodiment. Expansion device 18 includes a housing 40 and at least one blade 48, as illustrated in FIGS. 3–8. Housing 40 defines a first orifice 44. Preferably, housing 40 is manufactured from and includes a rigid, steel material; however housing 40 can be manufactured from any material known by those skilled in the art, such as ceramics, carbon fiber, any metal or metallic alloy, any plastic, or any other material. As defined herein, an orifice, such as first orifice 44, is any opening through which fluid, such as heat transfer fluid 34, can pass. The orifice may have one of many shapes, such as a circular shape (as illustrated in FIGS. 7–9), a teardrop shape, an eye shape (as illustrated in FIGS. 3–6), a square or rectangular shape, a triangular shape, or any other regular or irregular geometric shape. Blade 48 is connected with housing 40. Preferably, blade 48 is connected to housing 40, as illustrated in FIGS. 3–8. In one embodiment, blade 48 is connected to at least one track 56 within housing 40, wherein track 56 defines a path upon which blade 48 travels. Blade 48 may have one of many shapes, such as a circular shape or disc shape, a V shape (as illustrated in FIGS. 3–5), a curved shape (as illustrated in FIGS. 7–9), a square or rectangular shape (as illustrated in FIG. 6), or any irregular shape. Blade 48 includes and is manufactured from any material known by those skilled in the art, such as ceramics, carbon fiber, any metal or metallic alloy, any plastic, or any other material. Preferably, blade 48 includes and is manufactured from spring steel.

Blade 48 is movable between a first position, as illustrated in FIG. 4, and a second position, as illustrated in FIGS. 3 and 5, wherein the first orifice 44 is larger in the first position than in the second position. Blade 48 can be either manually moved from a first position to a second position or automatically moved, by means of a motor or other means, from a first position to a second position. As defined herein, an orifice, such as orifice 44, is made larger when the cross-sectional area of the orifice is effectively increased and an orifice is made smaller when the cross-sectional area of the orifice is effectively decreased, as illustrated in FIGS. 3–5. By increasing or decreasing the cross-sectional areas of an orifice, such as orifice 44, the rate of volumetric expansion within a heat transfer fluid 34 can be controlled and varied. Preferably, blade 48 overlaps at least a portion of the first orifice when blade 48 is in the second position, thereby making the first orifice smaller.

In one embodiment, expansion device 18 includes a first blade 50 and a second blade 52, as illustrated in FIGS. 3–5. Preferably, first and second blades 50, 52 are connected to housing 40, as illustrated in FIGS. 3–8. In one embodiment, first and second blades 50, 52 are connected to at least one track 56 within housing 40, wherein track 56 defines a path upon which first and second blades 50, 52 travel. First blade 50 and second blade 52 are movable between a first position and a second position, wherein the first orifice 44 is larger in the first position than in the second position, as illustrated in FIGS. 3–5.

In one embodiment, expansion device 18 includes a single blade 48, wherein single blade 48 defines a second orifice 46, as illustrated in FIG. 6. Preferably, second orifice 46 is adjacent first orifice 44. Blade 48 is movable between a first position and a second position, wherein the first orifice is larger in the first position than in the second position. By moving blade 48 between a first and second position, second orifice 46 overlaps with portions of first orifice 44, and first orifice 44 can be made larger or smaller.

In one embodiment expansion device 18 includes a series of blades 48, wherein the series of blades 48 define a second orifice 46, as illustrated in FIGS. 7–9. Second orifice 46 overlaps first orifice 44. Preferably, second orifice 46 is adjacent first orifice 44. Blades 48 are movable between a first position and a second position, wherein the second orifice 46 is larger in the first position than in the second position. By moving blades 48 between a first and second position, second orifice 46 can be made larger or smaller. Since second orifice 46 overlaps first orifice 44, first orifice 44 can be made larger or smaller as second orifice 46 is made larger or smaller. In one embodiment, the series of blades 48 define a second orifice 46 that is generally circular, as illustrated in FIGS. 7–9. In this embodiment, the series of blades 48 are arranged in a formation that resembles the aperture of a camera lens.

In one embodiment, sensor 32 controls the movement of at least one blade 48 between a first position and a second position. Preferably, sensor 32 is connected with a moving device (not shown), such as an electric motor or an electromagnet, wherein the moving device can be used to automatically move blade 48 from a first position to a second position upon receiving a signal from sensor 32.

Figure 10:
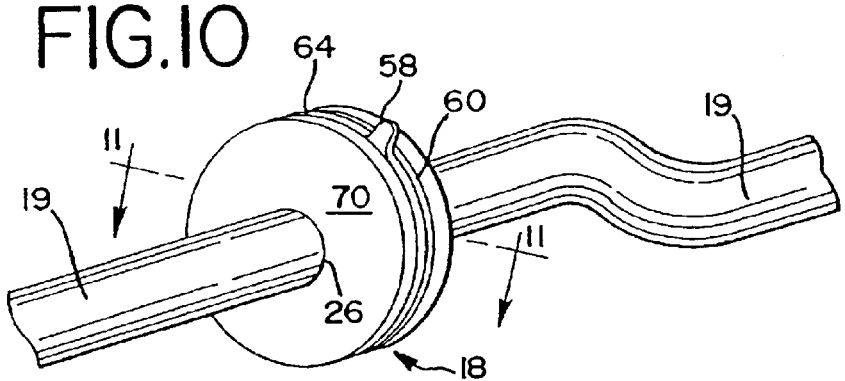
FIG. 10 is a perspective view of an expansion device connected with a line, in accordance with one embodiment of the invention.
Figure 11:
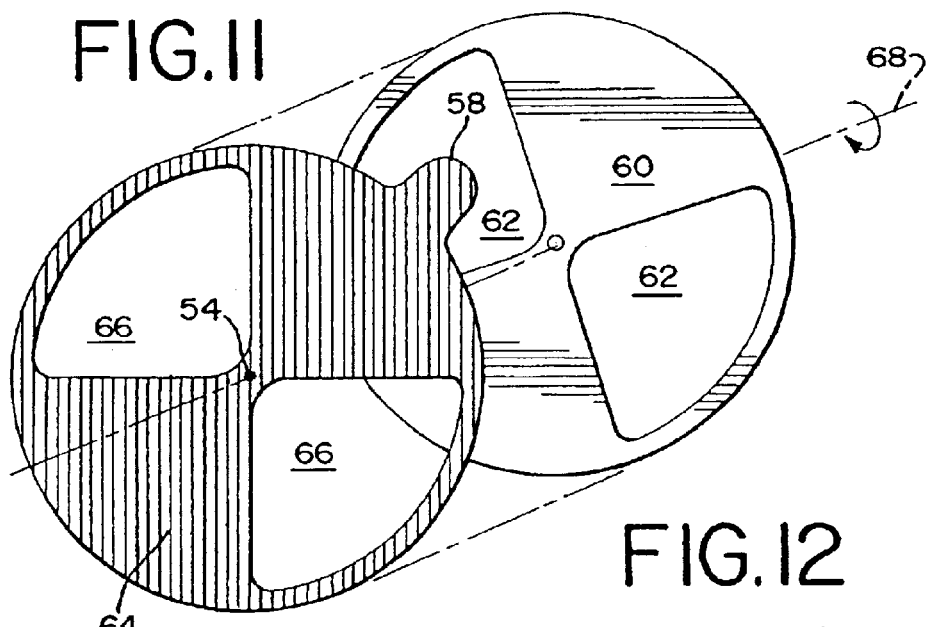
FIG. 11 is an exploded perspective view of the expansion device in FIG. 9.
Figure 12:
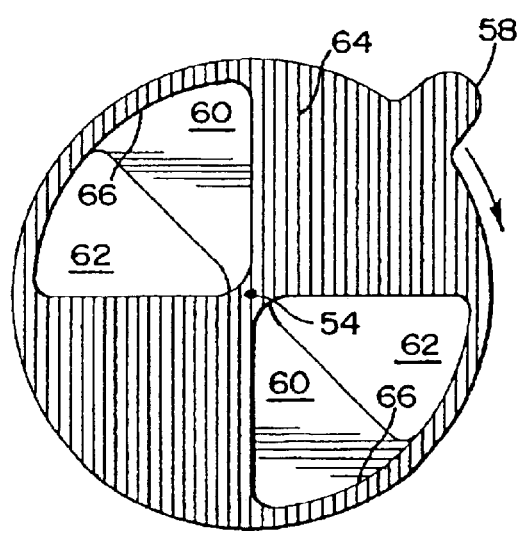
FIG. 12 is a cross-sectional view of the expansion device in FIG. 9, wherein the expansion device is in a partially open position.
Figure 17:
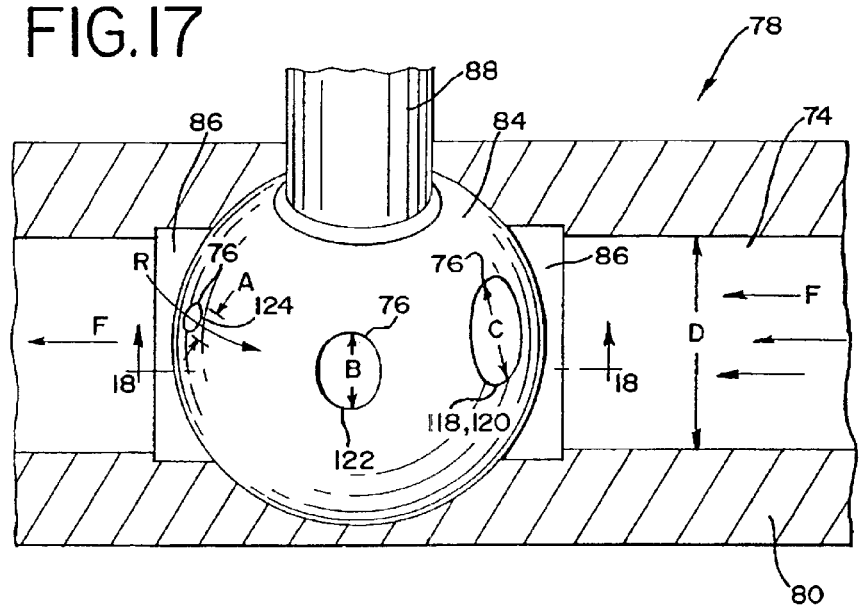
FIG. 17 is an enlarged, partial, cross-sectional view of the expansion device in FIG. 16, in accordance with one embodiment of the invention.

In one embodiment, expansion device 18 includes a first sheet 60 defining a first orifice 62, and a second sheet 64 overlapping the first sheet 60, as illustrated in FIGS. 10–15. First sheet 60 and second sheet 64 can be manufactured from and include any material known by those skilled in the art, such as ceramics, carbon fiber, any metal or metallic alloy, any plastic, or any other material. Preferably, first sheet 60 and second sheet 64 are manufactured from and include ceramic material. First sheet 60 and second sheet 64 may have one of many shapes, such as a circular shape or disc shape (as illustrated in FIGS. 3–5), a V shape, a curved shape, a square or rectangular shape, or any irregular shape. Second sheet 64 defines a second orifice 66, wherein the second orifice 66 is movable between a first position and a second position, and wherein the second orifice is larger in the first position than in the second position. In one embodiment, at least one of first sheet 60 and second sheet 64 rotate about a common axis 68, as illustrated in FIG. 11. Preferably, the common axis 68 is generally centered on first sheet 60 and second sheet 64. In one embodiment, first sheet 60 is fixed with respect to a housing 70, and second sheet 64 rotates about a common axis 68, wherein axis 68 is located at the center of both first sheet 60 and second sheet 64, as illustrated in FIG. 10. Preferably, expansion device 18 includes a tab 58 protruding from housing 70 and connected with second sheet 64, wherein tab 58 allows for one to manually move second sheet 64 from a first position to a second position.

Preferably, heat transfer fluid 34 is used to lubricate either blades 48 or first and second sheets 60, 64, so that blades 48 and/or first and second sheets 60, 64 may move more freely about.

In one embodiment, second sheet 64 defines multiple orifices 66 and first sheet 60 defines a single orifice 62, wherein the size and shape of orifice 62 allows orifice 62 to overlap multiple orifices 66, as illustrated in FIG. 15. Multiple orifices 66 are movable between a first position and a second position, wherein the single orifice overlaps the multiple orifices in the second position, and wherein the single orifice 62 is made larger as the multiple orifices move to the second position, as illustrated in FIG. 15.

Another embodiment of expansion device 18 is shown in FIGS. 16–20 and is generally designated by the reference numeral 78. This embodiment is functionally similar to that described in FIGS. 2–15 which was generally designated by the reference numeral 18. As shown in FIG. 16, expansion device 78 is connected with line 19. Expansion device 78 includes a housing 80 and at least one ball 84 located within housing 80, as illustrated in FIGS. 16–20. Housing 80 includes a bore 72 that defines a housing orifice 74 upon which heat transfer fluid enters housing 80. Preferably, housing 80 includes a rigid, steel material; however housing 80 can be manufactured from any rigid material known by those skilled in the art, such as ceramics, carbon fiber, any metal or metallic alloy, any plastic, or any other rigid material. Housing 80 is preferably constructed as a two-piece structure having a set of threaded bosses 128 that receive a set of housing studs 94, as shown in FIG. 16. Housing 80 is connected with a tailpiece 82 through a set of openings 130 within tailpiece 82 and a set of threaded nuts 110 which receive housing studs 94, as illustrated in FIG. 16. A housing seal 92 is sized to be sealingly received between housing 80 and tailpiece 82.

Ball 84 sits within bore 72 of housing 80 and is sandwiched between two seats 86 that are sized to be sealingly received in the bore 72 of the housing 80. While in this embodiment ball 84 is in the shape of a sphere, ball 84 can have other shapes, such as a cylinder, a parallelogram, and a pyramid. Ball 84 forms a notch 126 that receives an adjustment stem 88 through a second bore 130 of housing 80. A stem washer 90 surrounds the base of adjustment stem 88. The adjustment stem 88 receives a packing 98, a packing follower 100, a packing spring 102, a spring cap 104, and a thrust bearing 106 which overlie the washer 90 and are generally located within the bore 130. A base 96 holds the adjustment stem 88 within bore 130. A tip 89 of adjustment stem 88 pokes through an opening in the base 96. A handle 112 forms an opening 116 that is fitted over the tip 89. A handle set screw 114 secures the handle 112 to adjustment stem 88. As the handle 112 rotates in a rotational direction R, adjustment stem 88 and the ball 84 also rotate in a direction R, as illustrated in FIG. 16.

Figure 18:
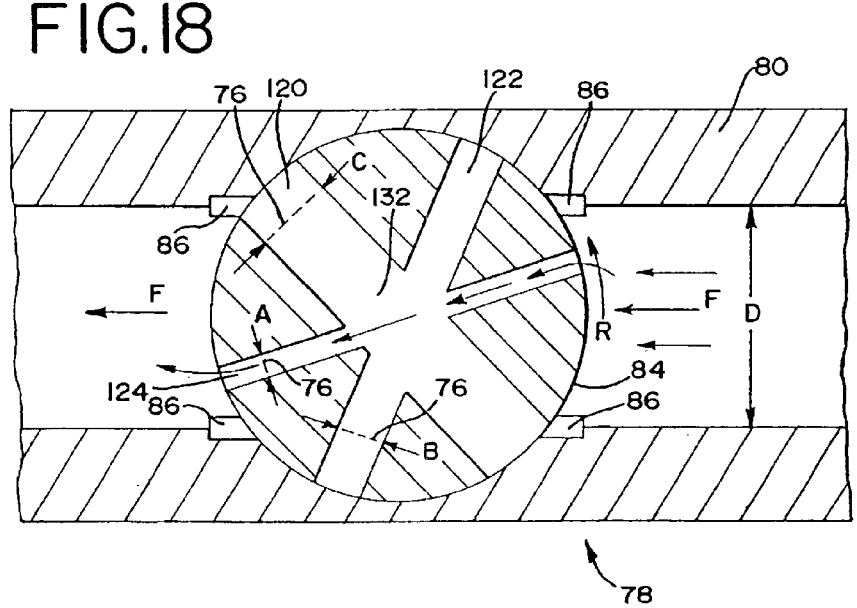
FIG. 18 is a cross-sectional view of the expansion device in FIG. 17 taken along line 18, in accordance with one embodiment of the invention.
Figure 19:
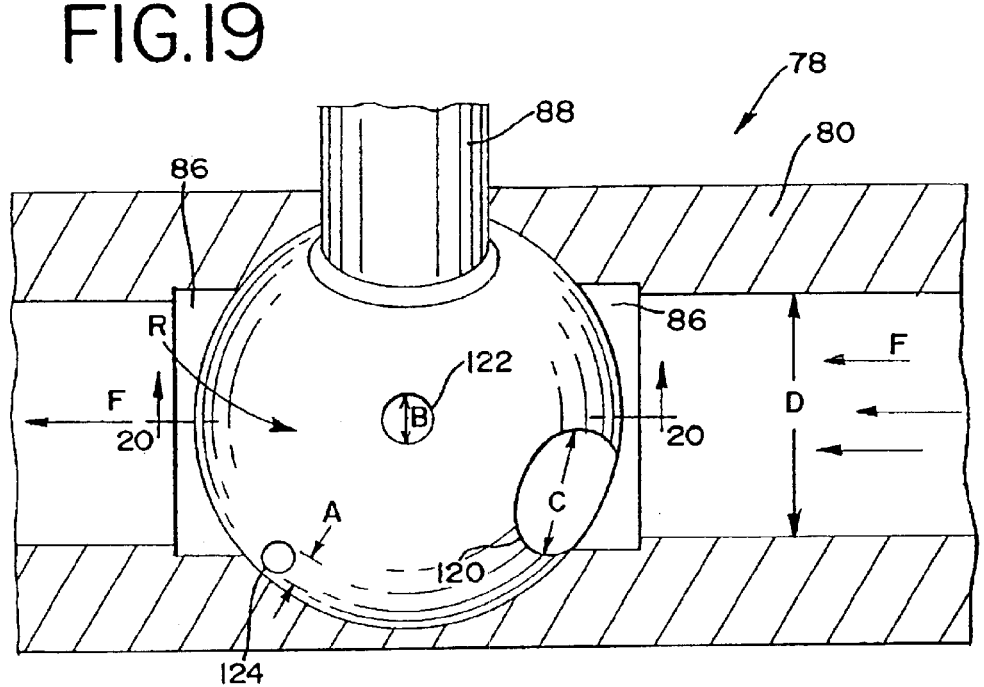
FIG. 19 is an enlarged, partial, cross-sectional view of an expansion device, in accordance with one embodiment of the invention.
Figure 20:
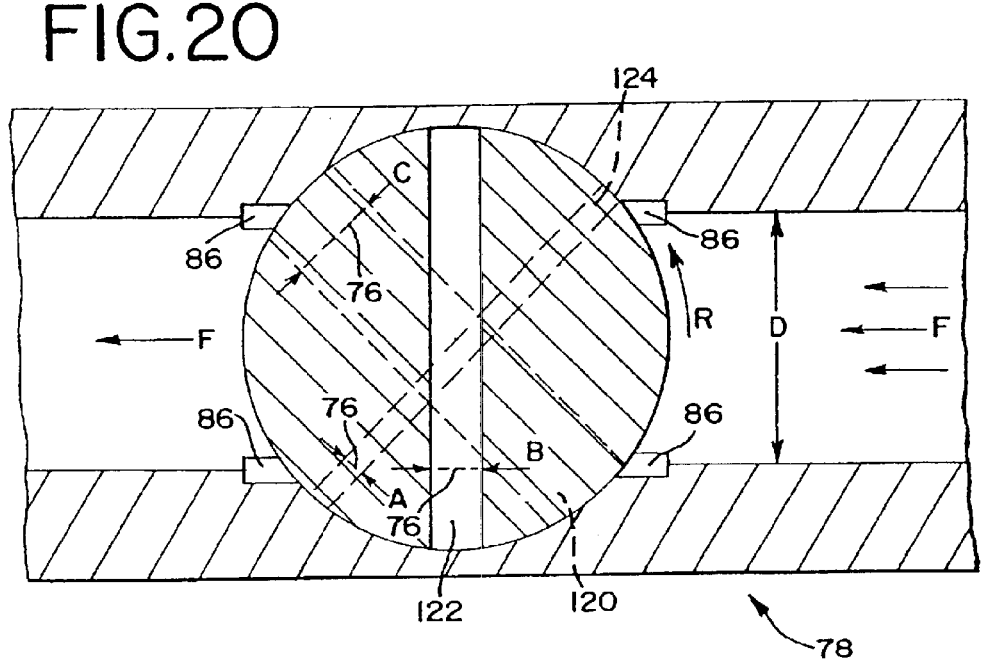
FIG. 20 is a cross-sectional view of the expansion device in FIG. 19 taken along line 20, in accordance with one embodiment of the invention.

As handle 112 rotates, ball 84 is movable between a first position and a second position. Ball 84 forms at least two channels 118 which each form a channel orifice 76, as illustrated in FIGS. 18 and 20–22. In one embodiment, each channel 118 goes all the way through ball 84, as illustrated in FIGS. 18 and 20. In one embodiment, first channel 120 goes through the ball 84, while second channel 122 only goes part way through the ball 84, and intersects with first channel 120 at a point within the ball 84, as illustrated in FIG. 22. The first channel 120 forms a first channel orifice 76 having effective cross-sectional area of C and the second channel 122 forms a second channel orifice 76 having an effective cross-sectional area of B, wherein the effective cross-sectional area C is not equal to the effective cross-sectional area B, as illustrated in FIGS. 18 and 20–22. As defined herein, the effective cross-sectional area is the cross-sectional area along a plane through the channel, wherein the plane is generally perpendicular to the direction F of the flow of heat transfer fluid 34 through that channel. Preferably, the effective cross-sectional area C is greater than the effective cross-sectional area B. More preferably, the effective cross-sectional area C is greater than the effective cross-sectional area B by at least 5%, and more preferably by at least 10%.

While a channel, such as first channel 120, may define a number of orifices along the developed length of that channel, as defined herein, the channel orifice 76 is the orifice defined by a channel that has the smallest cross-sectional area from any other orifice defined by that channel. For example, as illustrated in FIG. 22, the second channel 122 defines a first orifice 76 and a second orifice 77, wherein the first orifice 75 has an effective cross-sectional area of B and the second orifice 77 has an effective cross-sectional area of G, and wherein the effective cross-sectional area B is less than the effective cross-sectional area G, the channel orifice 76 is the first orifice 75.

Figure 21:
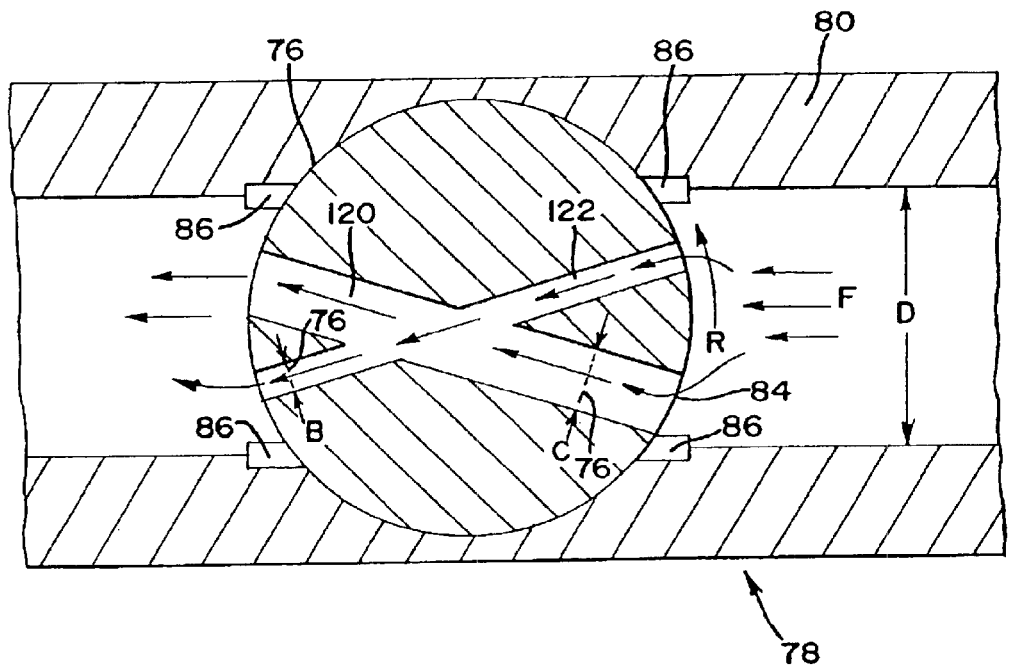
FIG. 21 is a cross-sectional view of the expansion device, in accordance with one embodiment of the invention.
Figure 22:
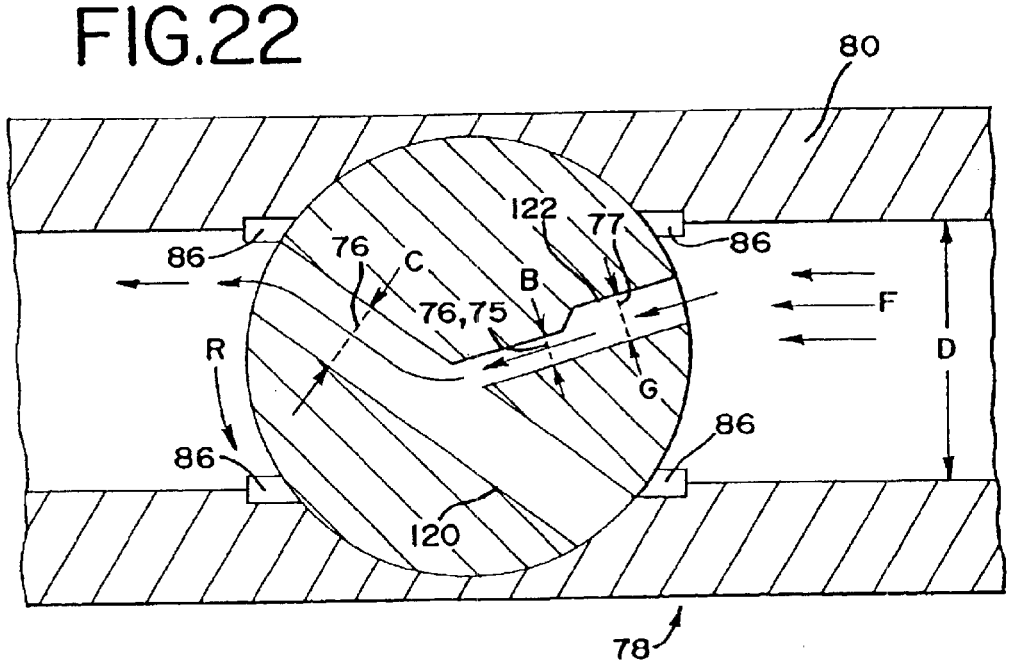
FIG. 22 is a cross-sectional view of the expansion device, in accordance with one embodiment of the invention.

The heat transfer fluid 34 flows in a direction F through line 19 and into the expansion device 78 through the housing orifice 74 having a diameter D, as illustrated in FIGS. 17–22. Heat transfer fluid 34 then flows through either the first channel 120 or the second channel 122, depending on the position of ball 84. For example, when the ball 84 is in a first position, the heat transfer fluid 34 may flow through the first channel 120, and when ball 84 is in a second position, the heat transfer fluid 34 may flows through the second channel 122. In one embodiment, when the ball 84 is in a first position, the heat transfer fluid 34 may flow through the first channel 120 and the second channel 122, as illustrated in FIG. 21 and FIG. 22.

As defined herein, an orifice, such as orifice 74, is made larger when the cross-sectional area of the orifice is effectively increased and an orifice is made smaller when the cross-sectional area of the orifice is effectively decreased. By moving the ball 84 from a first position to a second position, the cross-sectional area of housing orifice 74 can be effectively increased or decreased; thus the rate of volumetric expansion within a heat transfer fluid 34 which flows through the housing orifice 74, and through expansion device 78 can be precisely controlled and varied.

The ball 84 can be either manually moved from a first position to a second position or automatically moved, by means of a motor or other means, from a first position to a second position. In one embodiment, sensor 32 controls the movement of ball 84 between a first position and a second position. Preferably, sensor 32 is connected with a moving device (not shown), such as an electric motor or an electromagnet, wherein the moving device can be used to automatically move ball 84 from a first position to a second position upon receiving a signal from sensor 32.

In one embodiment, the ball 84 forms a first channel 120 having an orifice 76 with an effective cross-sectional area C, a second channel 122 having an orifice 76 with an effective cross-sectional area B, and a third channel 124 having an orifice 76 with an effective cross-sectional area A, wherein the effective cross-sectional area A is not equal to effective cross-sectional areas C or B, and the effective cross-sectional area C is not equal to the effective cross-sectional area B, as illustrated in FIGS. 17–20.

In one embodiment, the first channel 120 and the second channel 122 form an intersection 132, wherein the path of the first channel 120 crosses the path of the second channel 122, as illustrated in FIGS. 18, 21 and 22. In one embodiment, the first channel 120 is located above or below the second channel 122 and therefore does not form an intersection with the second channel 122, as illustrated in FIG. 20.

In one embodiment, the first channel 120 and the second channel 122 are positioned near one another so that the heat transfer fluid 34 may flow through either the first channel 120, the second channel 122, or through both the first and the second channel 120, 122, depending on the position of ball 84, as illustrated in FIG. 21. For example, when the ball 84 is in a first position, the heat transfer fluid 34 may flow through the first channel 120, and when ball 84 is in a second position, the heat transfer fluid 34 may flow through the second channel 122. However, when the ball 84 is in a third position, the heat transfer fluid may flow through both the first and the second channel. In this embodiment, the effective cross-sectional area C of the first channel and the effective cross-sectional area B of the second channel may be equal to each other.

Figure 23:
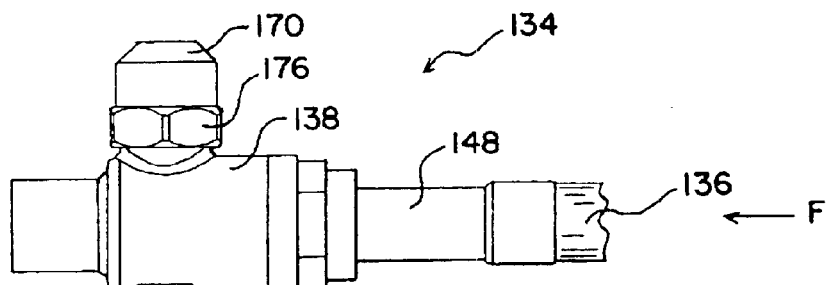
FIG. 23 is a perspective view of an expansion device in accordance with one embodiment of the present invention.
Figure 25:
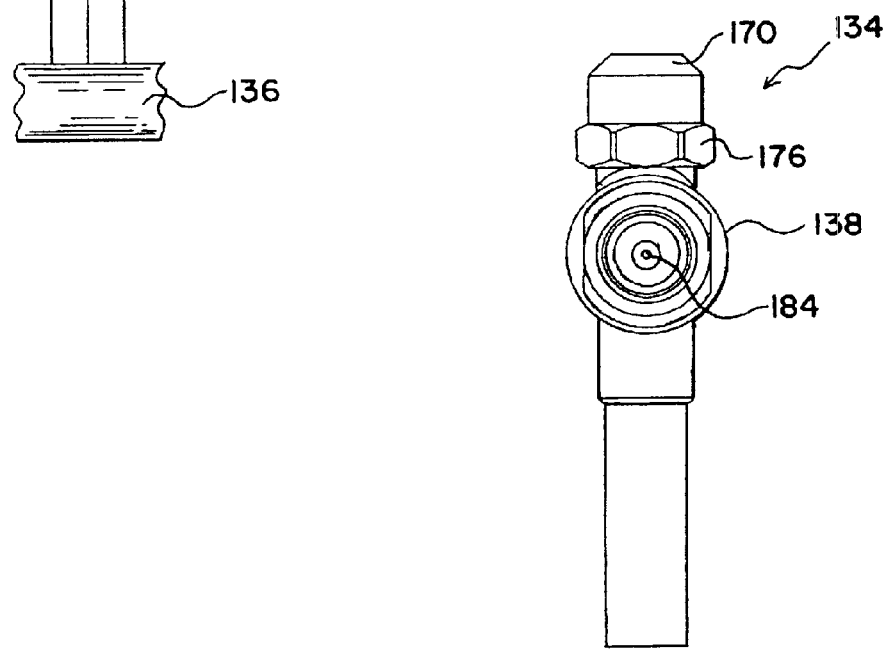
FIG. 25 is an edge view of the expansion device shown in FIGS. 23 and 24.
Figure 24:
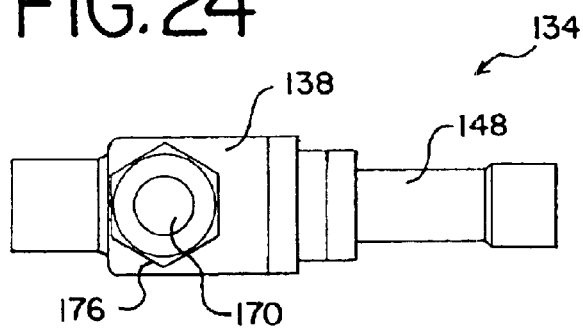
FIG. 24 is a top view of the expansion device shown in FIG. 23.
Figure 26:
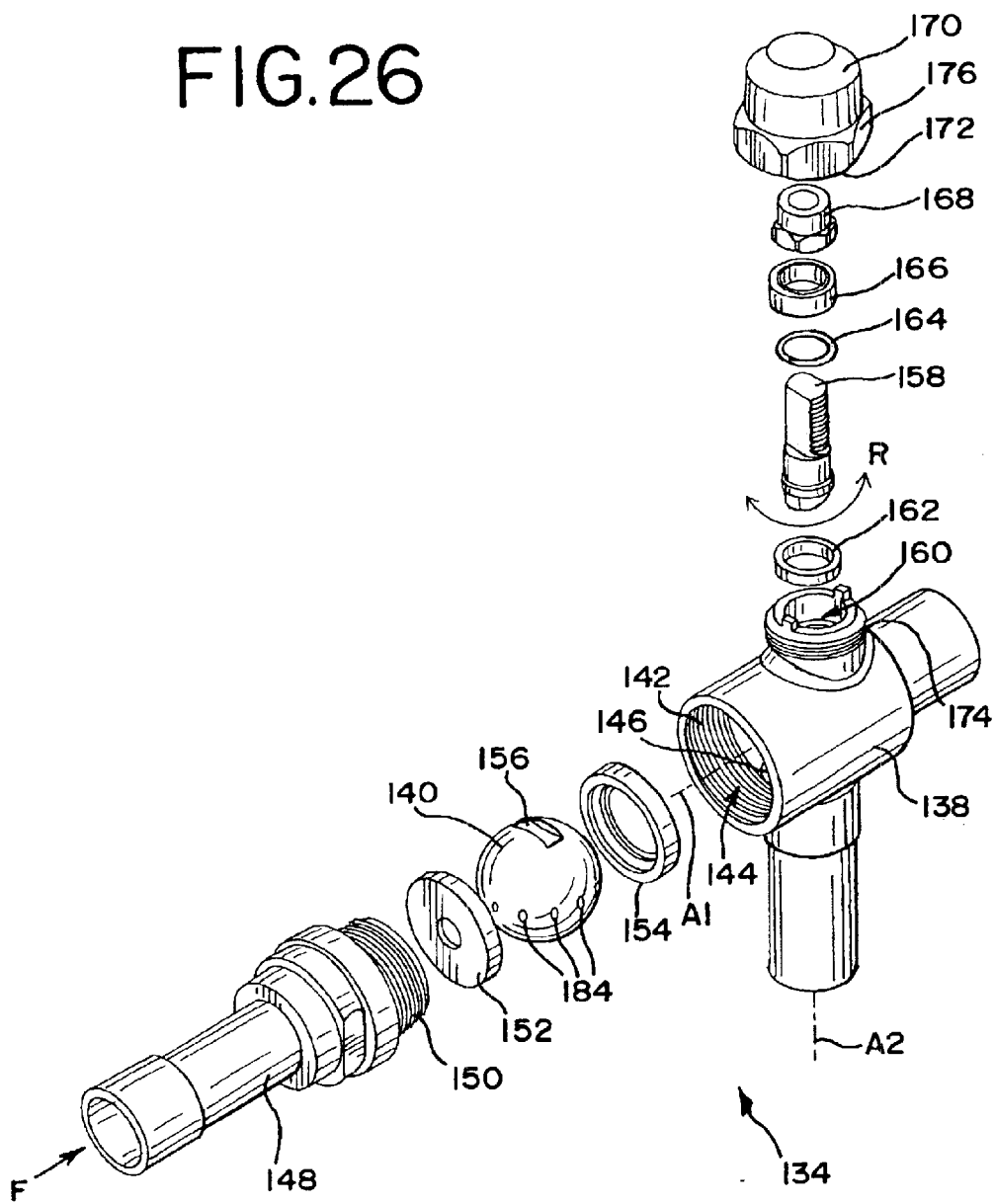
FIG. 26 is an exploded perspective view of the expansion device shown in FIGS. 23–35.

Another embodiment of expansion device 18 is shown in FIGS. 23–30 and is generally designated by the reference numeral 134. This embodiment is functionally similar to that described in FIGS. 2–15 which was generally designated by the reference numeral 18, and to that described in FIGS. 16–22 which was generally designated by the reference numeral 78. As shown in FIG. 23, expansion device 134 is connected with line 136. Expansion device 134 includes a housing 138 and at least one flow-regulating member 140 located within housing 138, as illustrated in FIG. 26. Housing 138 includes a first threaded bore 142 that defines a first housing orifice 144 through which heat transfer fluid enters housing 138, and a second housing orifice 146 through which heat transfer fluid exits housing 138. A first axis A1 passing through a center of the first housing orifice 144 is substantially perpendicular to a second axis A2 passing through a center of the second housing orifice 146, such that heat transfer fluid entering the housing 138 exits in a direction that is at approximately a right angle to its path of entry.

Preferably, housing 138 includes a rigid, steel material; however housing 138 can be manufactured from any rigid material known by those skilled in the art, such as ceramics, carbon fiber, any metal or metallic alloy, any plastic, or any other rigid material. Housing 138 is preferably constructed as a two-piece structure analogous to the two-piece structure shown in FIG. 16. In a presently preferred design, housing 138 is connected with a tailpiece 148 that contains a threaded portion 150 that has a complementary thread to that of first threaded bore 142. As shown in FIG. 26, first threaded bore 142 comprises a female thread and threaded portion 150 comprises a male thread. However, an alternative configuration in which first threaded bore 142 comprises a male thread and threaded portion 150 comprises a female thread is also contemplated.

Flow-regulating member 140 sits within first bore 142 of housing 138 and is sandwiched between a washer 152 and a seat 154 that are sized to be sealingly received in the first bore 142 of the housing 138. As shown in FIG. 26, flow-regulating member 140 is in the shape of a sphere. However, alternative three-dimensional curvilinear shapes and other regular and irregular geometric structures may be adopted for flow-regulating member 140, including but not limited to hemispheres, spherical cones, ellipsoids, oblate spheroids, prolate spheroids, catenoids, cylinders, parallelograms, pyramids, and the like.

Flow-regulating member 140 has a notch 156 that receives an adjustment stem 158 through a top bore 160 of housing 138. A packing ring 162 surrounds the base of adjustment stem 158. The adjustment stem 158 receives a stem seal 164, a stem packing ring 166, a stem locking nut 168, and a stem cap 170. The stem cap 170 is threaded on an interior surface 172 and connects with a complementary threaded portion 174 of top bore 160. As shown in FIG. 26, the stem cap 170 comprises a female thread and threaded portion 174 comprises a male thread. However, an alternative configuration in which the stem cap 170 comprises a male thread and threaded portion 174 comprises a female thread is also contemplated.

Stem cap 170 comprises an out-of-round portion 176. As shown in FIGS. 23–26, out-of-round portion 176 is hexagonal and defines a set of six wrench flats configured for accepting torque from an installation tool such as a wrench (not shown). Adjustment stem 158 may be rotated in a rotational direction R by turning adjustment stem 158 either manually or by automated means. As adjustment stem 158 rotates, flow-regulating member 140 also rotate in a direction R, as illustrated in FIG. 26. The adjustment stem 158 may be turned by automated means through the agency of an actuator (not shown) mechanically coupled thereto. As used herein, the term "actuator" refers to any motive, electromotive, electrical, chemical, hydraulic, air, or electrochemical source of mechanical energy, including but not limited to motors, engines, and the like, and combinations thereof.

The flow-regulating member 140, shown in FIGS. 26–30 as a spherical ball for purposes of illustration, has a primary channel 178 and a plurality (i.e., two or more) of secondary channels 180. The primary channel 178 defines a primary channel orifice 182 in the flow-regulating member 140. Each of the secondary channels 180 defines a secondary channel orifice 184 in the flow-regulating member 140. In presently preferred configurations, the cross-sectional area of primary channel orifice 182 is larger than the cross-sectional areas of secondary channel orifices 184.

The plurality of secondary channel orifices 184 are located along a common periphery 186 of the flow-regulating member 140, such that an axis A3 passing through the primary channel orifice 182 intersects a plane P1 containing the common periphery 186 at a unique point P. In presently preferred configurations, wherein the flow-regulating member 140 is spherical, the secondary channel orifices 184 are located along the equatorial periphery of the sphere and the primary channel orifice 182 is located at a pole of the sphere, such that the axis A3 passing through the primary channel orifice 182 is substantially perpendicular to axes A4 passing through each of the plurality of secondary channel orifices 184.

Figure 29:
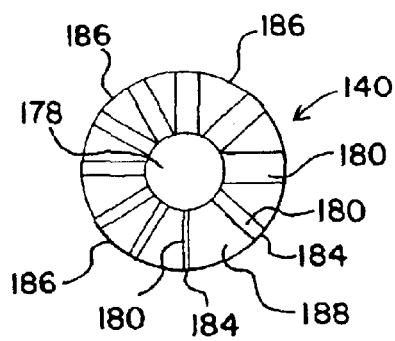
FIG. 29 is a cross-sectional view taken along the line A–A' of the flow-regulating member shown in FIGS. 27 and 28.
Figure 30:
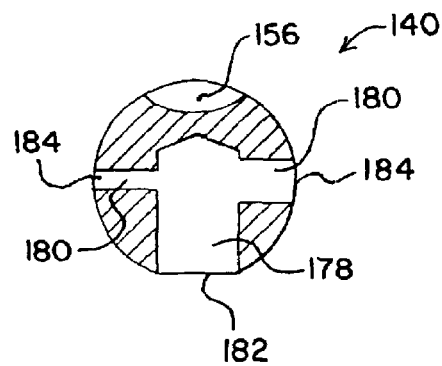
FIG. 30 is a cross sectional view taken along the line B–B' of the flow-regulating member shown in FIGS. 27–29.

In presently preferred configurations, the secondary channel orifices 184 have different cross-sectional areas, and the secondary channels 180 intersect the primary channel 178, as shown in FIGS. 29 and 30. In alternative configurations (not shown), one or more of the secondary channels 180 extends completely or partially through the flow-regulating member 140 without intersecting the primary channel 178.

As adjustment stem 158 rotates, flow-regulating member 140 is movable between a first position and a second position, such that at least one of the primary channel orifice 182 and the plurality of secondary channel orifices 184 is configured for being substantially aligned with one or the other of the first housing orifice 144 and the second housing orifice 146. As depicted in FIGS. 25 and 26, flow-regulating member 140 is configured such that any of the plurality of secondary channel orifices 184 may be aligned with first housing orifice 144 while the primary channel orifice 182 is aligned with the second housing orifice 146.

The heat transfer fluid 34 flows in a direction F through line 136 and into the expansion device 134 through the first housing orifice 144 as illustrated in FIGS. 23 and 26. Heat transfer fluid 34 then flows through the opening of washer 152 and whichever of the plurality of secondary channel orifices 184 that is aligned therewith. Heat transfer fluid 34 is substantially prevented from entering through any of the secondary channel orifices 184 that is not aligned with the opening of washer 152. Heat transfer fluid 34 exits the flow-regulating member 140 through the primary channel orifice 182.

Figure 27:
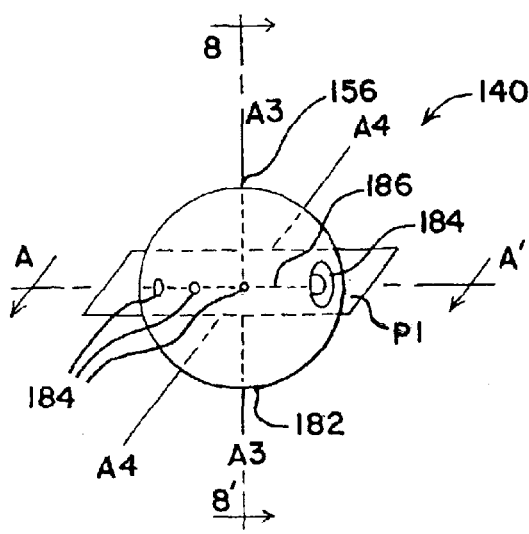
FIG. 27 is a perspective view of a flow-regulating member in accordance with one embodiment of the present invention.
Figure 28:
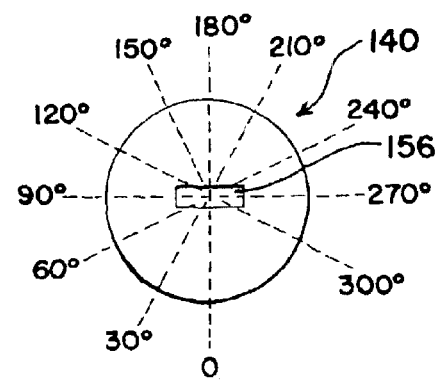
FIG. 28 is a top view of the flow-regulating member shown in FIG. 27.

In presently preferred configurations, the secondary channel orifices 184 are spaced apart at regular intervals along the common periphery 186, as best shown by FIGS. 27 and 29. Optionally, the flow-regulating member 140 may be designed such that the cross-sectional areas of the plurality of secondary channel orifices 184 continually increase moving in one direction along the common periphery 186.

As shown in FIG. 29, it is preferred that the flow-regulating member 140 comprise a solid portion 188 at one or more of these regular intervals along the common periphery 186, such that flow of the heat transfer fluid 34 through the flow-regulating member 140 is substantially prevented when the solid portion 188 is substantially aligned with the first housing orifice 144. When the flow-regulating member 140 is spherical, such that the common periphery 186 corresponds to a circular periphery, it is preferred that the secondary channel orifices 184 are spaced apart on the circular periphery by angles of at least about 15 degrees, and more preferably at least about 30 degrees. Similarly, it is preferred that the flow-regulating member 140 contains at least 7 secondary channels, which define at least 7 secondary channel orifices along the circular periphery of the ball, and desirably contains 11 secondary channels, as shown in FIG. 29, which define 11 secondary channel orifices located at regular intervals along the circular periphery of the ball. The 11 secondary channel orifices, shown in FIG. 29, are preferably located at angles corresponding to 0, 30, 60, 90, 120, 150, 180, 210, 240, 270, and 300 degrees of a circle defined by the circular periphery 186. A solid portion 188 is preferably located at an angle corresponding to 330 degrees of the circle defined by the circular periphery 186.

As defined herein, an orifice, such as first housing orifice 144, is made larger when the cross-sectional area of the orifice is effectively increased and an orifice is made smaller when the cross-sectional area of the orifice is effectively decreased. By moving the flow-regulating member 140 from a first position to a second position, the cross-sectional area of first housing orifice 144 can be effectively increased or decreased; thus the rate of volumetric expansion within a heat transfer fluid 34 which flows through the first housing orifice 144 and through expansion device 134 can be precisely controlled and varied.

The flow-regulating member 140 can be either manually moved from a first position to a second position or automatically moved, by means of a motor or other means, from a first position to a second position. In one embodiment, sensor 32 controls the movement of flow-regulating member 140 between a first position and a second position. Preferably, sensor 32 is connected with a moving device (not shown), such as an electric motor or an electromagnet, wherein the moving device can be used to automatically move flow-regulating member 140 from a first position to a second position upon receiving a signal from sensor 32.

Expansion device 18 may be combined with a traditional expansion device, wherein the traditional expansion device volumetrically expands heat transfer fluid 34 at a fixed rate. By combining expansion device 18 with a traditional expansion device, heat transfer fluid 34 can be volumetrically expanded at a varied rate, and thus simulate the effect of a thermostatic expansion valve, at a reduced cost.

Figure 31:
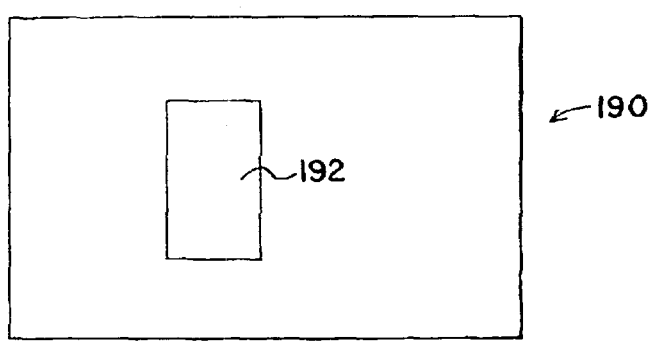
FIG. 31 is a schematic illustration of a vehicle embodying features of the present invention.

FIG. 31 shows a schematic illustration of a vehicle 190 containing an expansion device 192 of a type described hereinabove. As used herein, the term "vehicle" includes any device used for transport, which can be configured to have an expansion device and, in presently preferred embodiments, an air-conditioning system containing such an expansion device. Representative vehicles for use in accordance with the present invention include but are not limited to automobiles, motorcycles, scooters, boats, airplanes, helicopters, blimps, space shuttles, human transporters such as that sold under the tradename SEGWAY by Segway LLC (Manchester, N.H.), and the like.

Those skilled in the art will appreciate that numerous modifications can be made to enable vapor compression system 10 to address a variety of applications. For example, vapor compression system 10 operating in a retail food outlet may include a number of evaporators 16 that can be serviced by a common compressor 12. Also, in applications requiring refrigeration operations with high thermal loads, multiple compressors 12 can be used to increase the cooling capacity of the vapor compression system 10.

Those skilled in the art will recognize that vapor compression system 10 can be implemented in a variety of configurations. For example, the compressor 12, condenser 14, expansion device 18, and the evaporator 16 can all be housed in a single housing and placed in a walk-in cooler. In this application, the condenser 14 protrudes through the wall of the walk-in cooler and ambient air outside the cooler is used to condense the heat transfer fluid 34. In another application, vapor compression system 10 can be configured for air-conditioning a home or business. In yet another application, vapor compression system 10 can be used to chill water. In this application, the evaporator 16 is immersed in water to be chilled. Alternatively, water can be pumped through tubes that are meshed with the evaporator coil 44. In a further application, vapor compression system 10 can be cascaded together with another system for achieving extremely low refrigeration temperatures. For example, two vapor compression systems using different heat transfer fluids 34 can be coupled together such that the evaporator of a first system provides a low temperature ambient. A condenser of the second system is placed in the low temperature ambient and is used to condense the heat transfer fluid in the second system.

As known by one of ordinary skill in the art, every element of vapor compression system 10 described above, such as evaporator 16, liquid line 22, and suction line 30, can be scaled and sized to meet a variety of load requirements. In addition, the refrigerant charge of the heat transfer fluid in vapor compression system 10 may be equal to or greater than the refrigerant charge of a conventional system.

Furthermore, it is to be understood that considerable variation can be made in the parts of vapor compression systems, expansion devices, and flow-regulating members embodying features of the present invention, and in the quantity, connectivity, and placement of such parts. For example, the placement and quantity of compressors and/or condensers and/or evaporators and/or expansion devices can vary from one vapor compression system to another. Similarly, the inclusion and placement of sensors in such vapor compression systems are variables. These and related variations are well known to those of ordinary skill in the art, and fall within the scope of the appended claims and their equivalents.

Thus, it is apparent that there has been provided, in accordance with the invention, a vapor compression system that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, non-halogenated refrigerants can be used, such as ammonia, and the like can also be used. It is therefore intended to include within the invention all such variations and modifications that fall within the scope of the appended claims and equivalents thereof.

What is claimed is:

1. A vapor compression system comprising:
a line for flowing a heat transfer fluid;
a compressor connected with the line for increasing a pressure and a temperature of the heat transfer fluid;
a condenser connected with the line for liquefying the heat transfer fluid;
an evaporator connected with the line for transferring heat from an ambient surrounding to the heat transfer fluid; and
an expansion device connected with the line, wherein the expansion device comprises:
a housing containing a first housing orifice; and
at least one ball within the housing, wherein:
the ball contains a primary channel and a plurality of secondary channels; wherein the primary channel defines a primary channel orifice in the ball and the plurality of secondary channels define a plurality of secondary channel orifices in the ball; wherein the plurality of secondary channel orifices are located along a circular periphery of the ball, such that an axis passing through the primary channel orifice intersects a plane containing the circular periphery at a unique point; and wherein at least two of the plurality of secondary channel orifices have different cross-sectional areas;

the ball is moveable such that at least one of the primary channel orifice and the plurality of secondary channel orifices is configured for being substantially aligned with the first housing orifice; and at least one of the plurality of secondary channels intersects the primary channel.

2. The invention of claim 1 wherein the primary channel orifice has a larger cross-sectional area than any of the plurality of secondary channel orifices.

3. The invention of claim 1 wherein the plurality of secondary channel orifices are located along an equatorial periphery of the ball and wherein the primary channel orifice is located at a pole of the ball, such that an axis passing through the primary channel orifice is substantially perpendicular to axes passing through each of the plurality of secondary channel orifices.

4. The invention of claim 1 wherein the housing further contains a second housing orifice such that a first axis passing through a center of the first housing orifice is substantially perpendicular to a second axis passing through a center of the second housing orifice.

5. The invention of claim 4 wherein the primary channel orifice is substantially aligned with the first housing orifice and one of the plurality of secondary channel orifices is substantially aligned with the second housing orifice, or wherein the primary channel orifice is substantially aligned with the second housing orifice and one of the plurality of secondary channel orifices is substantially aligned with the first housing orifice.

6. The invention of claim 1 wherein the secondary channel orifices of the plurality are spaced apart at regular intervals along the circular periphery.

7. The invention of claim 6 wherein the ball comprises a solid portion at one or more of the regular intervals along the circular periphery, such that flow of the heat transfer fluid through the ball is substantially prevented when the solid portion is substantially aligned with an orifice in the housing.

8. The invention of claim 1 wherein the heat transfer fluid enters the ball through at least one of the plurality of secondary channel orifices and exits the ball through the primary channel orifice.

9. The invention of claim 1 wherein the secondary channel orifices of the plurality are spaced apart on the circular periphery by angles of at least about 15 degrees.

10. The invention of claim 1 wherein the secondary channel orifices of the plurality are spaced apart on the circular periphery by angles of at least about 30 degrees.

11. The invention of claim 1 wherein the plurality of secondary channels comprises at least 7 secondary channels, which define at least 7 secondary channel orifices along the circular periphery of the ball.

12. The invention of claim 1 wherein the plurality of secondary channels comprises 11 secondary channels, which define 11 secondary channel orifices located at regular intervals along the circular periphery of the ball.

13. The invention of claim 12 wherein the 11 secondary channel orifices are located at angles corresponding to 0, 30, 60, 90, 120, 150, 180, 210, 240, 270, and 300 degrees of a circle defined by the circular periphery.

14. The invention of claim 13 wherein the ball comprises a solid portion at an angle corresponding to 330 degrees of the circle defined by the circular periphery.

15. The invention of claim 1 wherein cross-sectional areas of the plurality of secondary channel orifices continually increase moving in one direction along the circular periphery of the ball.

16. The invention of claim 1 further comprising a sensor connected with the expansion device.

17. The invention of claim 1 wherein the expansion device further comprises a washer adjacent to one side of the ball, such that an opening in the washer is configured for being substantially aligned with one of the plurality of secondary channel orifices.

18. The invention of claim 17 wherein the heat transfer fluid enters the ball through one of the plurality of secondary channel orifices, which is substantially aligned with the opening in the washer.

19. An expansion device for a vapor compression system comprising:

a housing containing a first housing orifice; and at least one ball within the housing, wherein:

the ball contains a primary channel and a plurality of secondary channels; wherein the primary channel defines a primary channel orifice in the ball and the plurality of secondary channels define a plurality of secondary channel orifices in the ball; wherein the plurality of secondary channel orifices are located along a circular periphery of the ball, such that an axis passing through the primary channel orifice intersects a plane containing the circular periphery at a unique point; and wherein at least two of the plurality of secondary channel orifices have different cross-sectional areas;

the ball is moveable such that at least one of the primary channel orifice and the plurality of secondary channel orifices is configured for being substantially aligned with the first housing orifice; and at least one of the plurality of secondary channels intersects the primary channel.

20. The invention of claim 19 wherein the primary channel orifice has a larger cross-sectional area than any of the plurality of secondary channel orifices.

21. The invention of claim 19 wherein the plurality of secondary channel orifices are located along an equatorial periphery of the ball and wherein the primary channel orifice is located at a pole of the ball, such that an axis passing through the primary channel orifice is substantially perpendicular to axes passing through each of the plurality of secondary channel orifices.

22. The invention of claim 19 wherein the housing further contains a second housing orifice such that a first axis passing through a center of the first housing orifice is substantially perpendicular to a second axis passing through a center of the second housing orifice.

23. The invention of claim 22 wherein the primary channel orifice is substantially aligned with the first housing orifice and one of the plurality of secondary channel orifices is substantially aligned with the second housing orifice, or wherein the primary channel orifice is substantially aligned with the second housing orifice and one of the plurality of secondary channel orifices is substantially aligned with the first housing orifice.

24. The invention of claim 19 wherein the secondary channel orifices of the plurality are spaced apart at regular intervals along the circular periphery.

25. The invention of claim 24 wherein the ball comprises a solid portion at one or more of the regular intervals along the circular periphery, such that flow of the heat transfer fluid through the ball is substantially prevented when the solid portion is substantially aligned with an orifice in the housing.

26. The invention of claim 19 wherein the heat transfer fluid enters the ball through at least one of the plurality of secondary channel orifices and exits the ball through the primary channel orifice.

27. The invention of claim 19 wherein the secondary channel orifices of the plurality are spaced apart on the circular periphery by angles of at least about 15 degrees.

28. The invention of claim 19 wherein the secondary channel orifices of the plurality are spaced apart on the circular periphery by angles of at least about 30 degrees.

29. The invention of claim 19 wherein the plurality of secondary channels comprises at least 7 secondary channels, which define at least 7 secondary channel orifices along the circular periphery of the ball.

30. The invention of claim 19 wherein the plurality of secondary channels comprises 11 secondary channels, which define 11 secondary channel orifices located at regular intervals along the circular periphery of the ball.

31. The invention of claim 30 wherein the 11 secondary channel orifices are located at angles corresponding to 0, 30, 60, 90, 120, 150, 180, 210, 240, 270, and 300 degrees of a circle defined by the circular periphery.

32. The invention of claim 31 wherein the ball comprises a solid portion at an angle corresponding to 330 degrees of the circle defined by the circular periphery.

33. The invention of claim 19 wherein cross-sectional areas of the plurality of secondary channel orifices continually increase moving in one direction along the circular periphery of the ball.

34. The invention of claim 19 further comprising a sensor connected with the expansion device.

35. The invention of claim 19 wherein the expansion device further comprises a washer adjacent to one side of the ball, such that an opening in the washer is configured for being substantially aligned with one of the plurality of secondary channel orifices.

36. The invention of claim 35 wherein the heat transfer fluid enters the ball through one of the plurality of secondary channel orifices, which is substantially aligned with the opening in the washer.

37. A flow-regulating member for an expansion device of a vapor compression system, which has a primary channel and a plurality of secondary channels, wherein:
the primary channel defines a primary channel orifice in the flow-regulating member and the plurality of secondary channels define a plurality of secondary channel orifices in the flow-regulating member;
the plurality of secondary channel orifices are located along a common periphery of the flow-regulating member, such that an axis passing through the primary channel orifice intersects a plane containing the common periphery at a unique point;
at least two of the plurality of secondary channel orifices have different cross-sectional areas;
at least one of the plurality of secondary channels intersects the primary channel; and
the flow-regulating member comprises a shape selected from the group consisting of spheres, hemispheres, spherical cones, ellipsoids, oblate spheroids, prolate spheroids, catenoids, cylinders, parallelograms, and pyramids.

38. The invention of claim 37 wherein the flow-regulating member has a three-dimensional curvilinear shape.

39. The invention of claim 38 wherein the three-dimensional curvilinear shape is selected from the group consisting of a sphere, a hemisphere, a spherical cone, an ellipsoid, an oblate spheroid, a prolate spheroid, and a catenoid.

40. The invention of claim 38 wherein the three-dimensional curvilinear shape is a sphere.

41. The invention of claim 37 wherein the primary channel orifice has a larger cross-sectional area than any of the plurality of secondary channel orifices.

42. The invention of claim 40 wherein the plurality of secondary channel orifices are located along an equatorial periphery of the sphere and wherein the primary channel orifice is located at a pole of the sphere, such that an axis passing through the primary channel orifice is substantially perpendicular to axes passing through each of the plurality of secondary channel orifices.

43. The invention of claim 37 wherein the secondary channel orifices of the plurality are spaced apart at regular intervals along the common periphery.

44. The invention of claim 43 wherein the flow-regulating member comprises a solid portion located at one or more of the regular intervals along the common periphery.

45. The invention of claim 40 wherein the common periphery is a circle, and wherein the secondary channel orifices of the plurality are spaced apart on the common periphery by angles of at least about 15 degrees.

46. The invention of claim 40 wherein the common periphery is a circle, and wherein the secondary channel orifices of the plurality are spaced apart on the common periphery by angles of at least about 30 degrees.

47. The invention of claim 37 wherein the plurality of secondary channels comprises at least 7 secondary channels, which define at least 7 secondary channel orifices along the common periphery of the flow-regulating member.

48. The invention of claim 40 wherein the common periphery is a circle, and wherein the plurality of secondary channels comprises 11 secondary channels, which define 11 secondary channel orifices located at regular intervals along the common periphery of the flow-regulating member.

49. The invention of claim 48 wherein the 11 secondary channel orifices are located at angles corresponding to 0, 30, 60, 90, 120,150, 180, 210, 240, 270, and 300 degrees of the circle defined by the common periphery.

50. The invention of claim 49 wherein the flow-regulating member comprises a solid portion at an angle corresponding to 330 degrees of the circle defined by the common periphery.

51. The invention of claim 1 wherein cross-sectional areas of the plurality of secondary channel orifices continually increase moving in one direction along the common periphery of the flow-regulating member.

52. A vehicle comprising the expansion device of claim 19.

53. The invention of claim 52, wherein the vehicle is selected from the group consisting of an automobile, a motorcycle, a scooter, a boat, an airplane, and a helicopter.

54. A method for operating a vapor compression system comprising flowing a heat transfer fluid through a line connected with each of a compressor for increasing a pressure and a temperature of the heat transfer fluid, a condenser for liquefying the heat transfer fluid, an evaporator for transferring heat from an ambient surrounding to the heat transfer fluid, and the expansion device of claim 19.

55. The invention of claim 54 wherein the operating of the vapor compression system results in a decrease in ambient temperature.

* * * * *